(12) United States Patent
Kurata

(10) Patent No.: US 9,612,381 B2
(45) Date of Patent: *Apr. 4, 2017

(54) LIGHT GUIDE PLATE AND SURFACE ILLUMINATION DEVICE

(71) Applicant: OMRON Corporation, Kyoto (JP)

(72) Inventor: Gouo Kurata, Tsurugashima (JP)

(73) Assignee: OMRON Corporation, Kyoto-shi (JP)

( * ) Notice: Subject to any disclaimer, the term of this patent is extended or adjusted under 35 U.S.C. 154(b) by 211 days.

This patent is subject to a terminal disclaimer.

(21) Appl. No.: 14/013,672

(22) Filed: Aug. 29, 2013

(65) Prior Publication Data

US 2014/0211125 A1 Jul. 31, 2014

(30) Foreign Application Priority Data

Jan. 30, 2013 (JP) ................................. 2013-015142

(51) Int. Cl.
*F21V 8/00* (2006.01)

(52) U.S. Cl.
CPC ........... *G02B 6/002* (2013.01); *G02B 6/0016* (2013.01); *G02B 6/0018* (2013.01); *G02B 6/0038* (2013.01)

(58) Field of Classification Search
CPC .... G02B 6/002; G02B 6/0013; G02B 6/0015; G02B 6/0016; G02B 6/0046; G02B 6/0038
See application file for complete search history.

(56) References Cited

U.S. PATENT DOCUMENTS

| 9,075,171 B2 * | 7/2015 | Kurata | G02B 6/0016 |
| 2010/0165254 A1 * | 7/2010 | Lee | G02B 6/0038 |
| | | | 349/65 |

(Continued)

FOREIGN PATENT DOCUMENTS

| JP | 2002-343124 A | 11/2002 |
| JP | 2011-146176 A | 7/2011 |

(Continued)

OTHER PUBLICATIONS

Korean Office Action for Application No. 10-2013-0101544, issued Aug. 3, 2015 (10 pages).

(Continued)

*Primary Examiner* — Jessica M Merlin
(74) *Attorney, Agent, or Firm* — Nutter McClennen & Fish LLP; John J. Penny, Jr.

(57) ABSTRACT

A light guide plate includes a light introduction unit that confines light incident from a point light source through the light incident surface and a light guide plate body. The light introduction unit includes an inclined surface inclined toward an end of a surface of the light guide plate body from a surface in a portion having the thickness greater than that of the light guide plate body. The light guide plate body includes a directivity conversion pattern located between the light introduction unit and an effective illumination region of the light guide plate body. The directivity conversion pattern converts a directivity direction of the light passing through an effective illumination region from the light introduction unit such that an angle formed by the light and a direction perpendicular to the light incident surface increases when viewed from a direction perpendicular to a light exit surface.

13 Claims, 34 Drawing Sheets

(56) References Cited

U.S. PATENT DOCUMENTS

2011/0176089 A1\* 7/2011 Ishikawa .............. G02B 6/0018
  349/65
2012/0002441 A1\* 1/2012 Yabe ...................... G02B 6/002
  362/607

FOREIGN PATENT DOCUMENTS

| JP | 2012-138222 A | 7/2012 |
| KR | 2010-0007982 A | 1/2010 |
| KR | 2011-0083493 A | 7/2011 |
| WO | 2008/153024 A1 | 12/2008 |
| WO | 2010/070821 A1 | 6/2010 |

OTHER PUBLICATIONS

Korean Office Action for Application No. 10-2013-0101544, issued Nov. 28, 2014 (5 pages).
Taiwanese Office Action for Application No. 102135301, issued Oct. 8, 2014 (1 page).

\* cited by examiner

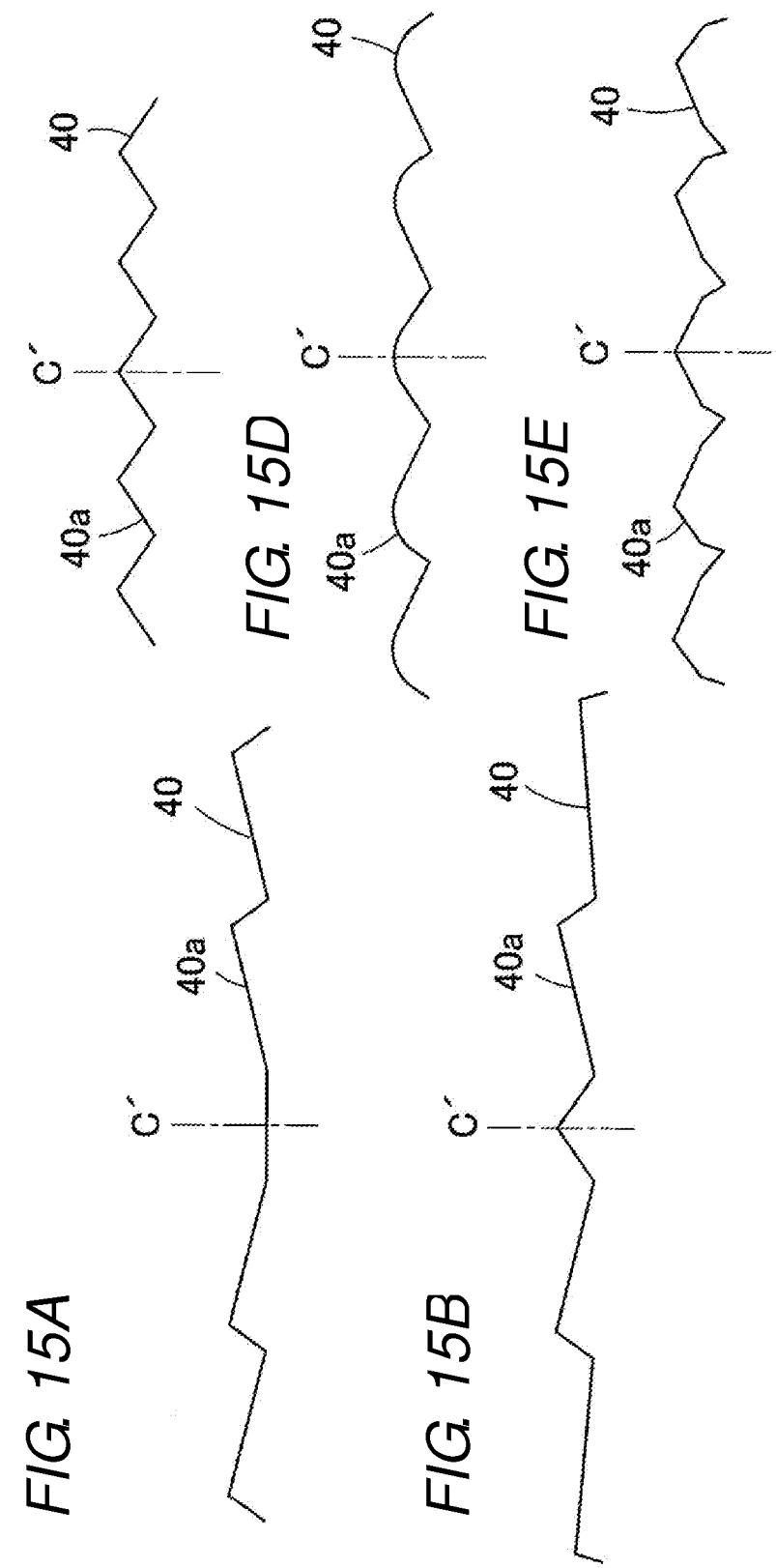

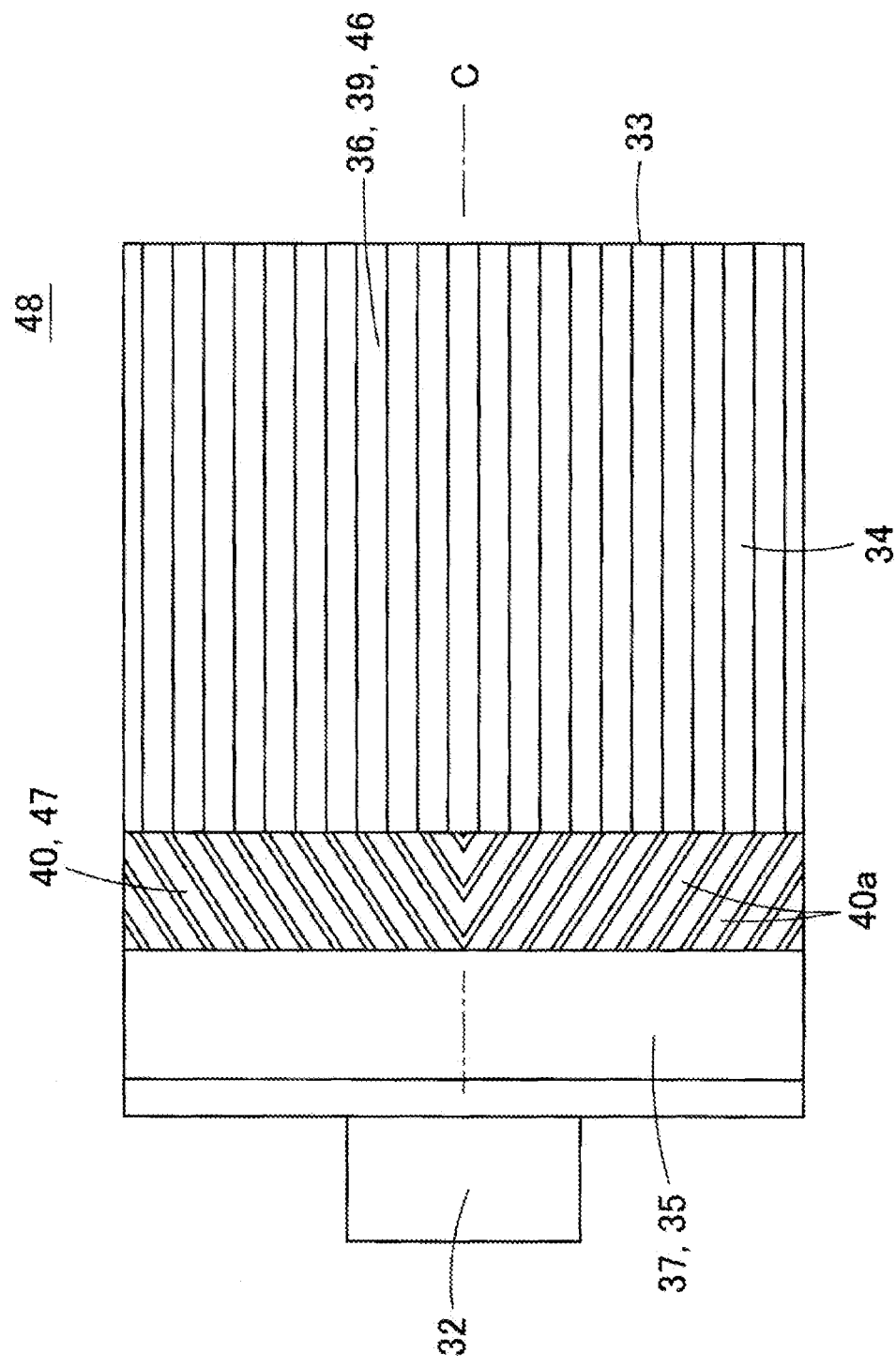

(B)

LIGHT GUIDE PLATE AND SURFACE ILLUMINATION DEVICE

CROSS-REFERENCE TO RELATED APPLICATION

This application claims the benefit of priority from Japanese Patent Application No. 2013-015142, filed on 30 Jan. 2013, the entire contents of which is incorporated herein by reference for all purposes.

BACKGROUND

The present invention relates to a light guide plate and a surface illumination device. Specifically, the present invention relates to a surface illumination device that is used as a backlight for a liquid crystal display device and a light guide plate that is used in the surface illumination device.

Nowadays, there is an increasing demand for a thin surface illumination device with progress of a thinner mobile device in which the surface illumination device is incorporated. In order to thin the surface illumination device, it is necessary to decrease a thickness of a light guide plate. However, there is a limitation to a decrease in height of a light source constructed by LEDs even if the thickness of the plate-like light guide plate can be decreased. Therefore, in the case that the plate-like thin light guide plate is used, the height of the light source is greater than the thickness of an end face (a light incident surface) of the light guide plate, and the light source, which is disposed while opposed to the light incident surface of the light guide plate, projects upward from an upper surface of the light guide plate. When the light source projects upward from the light guide plate, light emitted from the light source is not completely incident to the light incident surface of the light guide plate, but the light leaks partially to the outside to degrade light use efficiency.

Use of a light guide plate is proposed in order to solve the trouble. In the light guide plate, a light introduction unit in which the thickness is greater than that of a plate-like light guide plate body is provided at an end of the light guide plate body, and an inclined surface that is inclined toward the end of the light guide plate body from a point of the maximum thickness of the light introduction unit is provided in the light introduction unit. For example, International Publication No. WO2010/070821 and International Publication No. WO 2008/153024 disclose a surface illumination device in which the light guide plate is used.

FIG. 1 illustrates an example of a surface illumination device 11 in which the light guide plate including the light introduction unit having the thickness greater than that of the light guide plate body is used. A light guide plate 13 includes a light guide plate body 14 having the substantially even thickness and a light introduction unit 15 formed into a wedge shape. A deflection pattern or a diffusion pattern is formed in a rear surface of the light guide plate body 14, and a lenticular lens 16 is formed in a surface. An inclined surface 17 that is inclined toward the end of the light guide plate body 14 from the point of the maximum thickness of the light introduction unit 15 is provided in the light introduction unit 15. The thickness of the end face (the light incident surface) of the light introduction unit 15 is greater than the height of the light source 12. In the surface illumination device 11 in which the light guide plate 13 is used, the thickness of the end face of the light introduction unit 15 is greater than the height of the light source 12, whereby the light emitted from a light source 12 is efficiently taken in the light introduction unit 15. The light taken in the light introduction unit 15 is guided to the light guide plate body 14 to spread into a planar shape, and the light is deflected by the deflection pattern or the diffusion pattern to exit to the outside from the light exit surface of the light guide plate body 14. At this point, a directional pattern of the light exiting from the light exit surface is spread by the lenticular lens 16. Accordingly, a balance between improvement of the light use efficiency of the light source and the thinner surface illumination device can be established in the surface illumination device having the above structure.

However, in the light emitted from the light source (the LED light source), color changes gradually as a ray direction is inclined from a front direction (hereinafter referred to as a direction of an optical axis C) of the light source. Therefore, in the surface illumination device, unfortunately color unevenness is generated between the light exiting from the light exit surface in front of the light source and the light exiting from the light exit surface in a side end portion of the light guide plate.

FIGS. 2A and 2B illustrate a change in color (an average chromaticity value along a straight line of a direction φ) of the light in the direction φ when the light is emitted in the direction φ based on the direction of the optical axis C of the light source 12 as illustrated in FIG. 2C. In FIGS. 2A and 2B, chromatic display is illustrated using a CIE xy chromaticity diagram (for example, see "CIE's XYZ Coordinate System": http://fourier.eng.hmc.edu/e180/lectures/color1/node25.html) defined by International Commission on Illumination (CIE). In the CIE xy chromaticity diagram, a specific color can be expressed or designated by a pair of an x-coordinate and a y-coordinate. In FIGS. 2A and 2B, a horizontal axis expresses a light exit direction φ that is measured based on the direction of the optical axis C. In FIG. 2A, a vertical axis expresses a difference $\Delta x = x1 - x0$ between a value x1 of the x-coordinate of the chromaticity diagram indicating the color of the light exiting in the direction φ and a value x0 of the x-coordinate of the chromaticity diagram indicating the color of the light exiting in the direction of the optical axis C (φ=0°). Similarly, in FIG. 2B, the vertical axis expresses a difference $\Delta y = y1 - y0$ between a value y1 of the y-coordinate of the chromaticity diagram indicating the color of the light exiting in the direction φ and a value y0 of the y-coordinate of the chromaticity diagram indicating the color of the light exiting in the direction of the optical axis C (φ=0°).

As illustrated in FIGS. 2A and 2B, the color of the light emitted from the light source changes depending on the light exit direction φ. For this reason, the light incident to the light guide plate is colored in a different color according to the light guide direction, and possibly the color unevenness is generated in the light exit surface. For the surface illumination device 11 in which the light introduction unit 15 includes the inclined surface 17 as illustrated in FIG. 1, because the light guided toward the optical axis direction of the light source 12 in the light guide plate 13 and the light guided toward the direction inclined from the optical axis direction do not sufficiently mix with each other, the color unevenness is generated between a central portion (an A portion in FIG. 1) and both side end portions (B portions in FIG. 1) of the light guide plate.

FIG. 3 is a perspective view of the surface illumination device disclosed in International Publication No. WO2010/070821. In a surface illumination device 21 in FIG. 3, a light leak prevention pattern 22 including plural V-grooves parallel to each other is provided in the inclined surface 17 of the light introduction unit 15. The light leak prevention pattern 22 decreases the light leakage from the inclined surface 17 to improve the light use efficiency.

In the surface illumination device 21, because the light guide direction of the light reflected by the light leak prevention pattern 22 is bent into a width direction of the light guide plate, it is expected that the generation of the color unevenness is reduced by the mixture of the pieces of light having the different colors. However, actually the reduction of the color unevenness is restrictive and insufficient even in this structure.

In view of the problems described above, it is desired to provide a surface illumination device and a light guide plate for being able to reduce the generation of the color unevenness between the light source front region and both the side end portions of the light guide plate body in the light exit surface.

SUMMARY

In accordance with one aspect of at least one embodiment of the present invention, a light guide plate for introducing light from a light incident surface to output the light to an outside from a light exit surface, the light guide plate comprises: a light introduction unit configured to confine the light incident from the light incident surface; and a light guide plate body having a thickness smaller than a maximum thickness of the light introduction unit, the light guide plate body being provided so as to be continuously connected to the light introduction unit, the confined light being exited to the outside from the light exit surface by a light exit part, wherein the light introduction unit includes an inclined surface in at least one of a surface on a light exit side of the light guide plate and an opposite surface thereof, the inclined surface being inclined toward an end of a surface of the light guide plate body from a surface in a portion having a thickness greater than that of the light guide plate body, the light guide plate body includes a directivity conversion pattern in a region located between the light introduction unit and an effective illumination region of the light guide plate body in at least one of the surface on the light exit side of the light guide plate and the opposite surface thereof, and the directivity conversion pattern converts a directivity direction of the light passing through the effective illumination region from the light introduction unit such that an angle formed by the directivity direction of the light and a direction perpendicular to the light incident surface increases when viewed from a direction perpendicular to the light exit surface. As used herein, the directivity direction of the light means not the individual ray direction but the maximum intensity direction of the directivity characteristics of the light.

BRIEF DESCRIPTION OF THE DRAWINGS

FIGS. 15A to 15E are sectional views illustrating shapes of different directivity conversion patterns in the section parallel to the light incident surface;

FIG. 17 is a plan view of a surface illumination device according to a modification of the first embodiment of the present invention;

DETAILED DESCRIPTION

Hereinafter, an embodiment of the invention will be described in detail with reference to the accompanying drawings. However, the present invention is not limited to the following embodiments, but various design changes can be made without departing from the scope of the present invention.

First Embodiment

Figure 1:
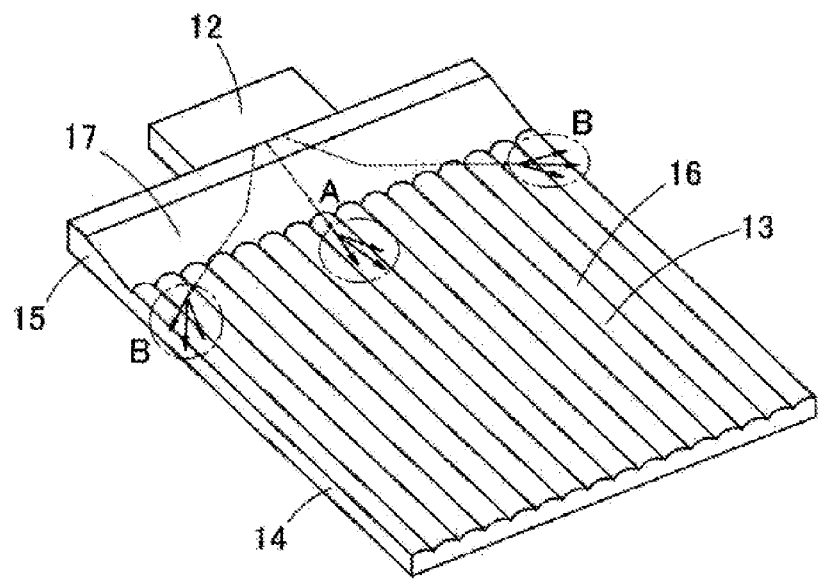
FIG. 1 is a perspective view illustrating a conventional surface illumination device.
Figure 2A:
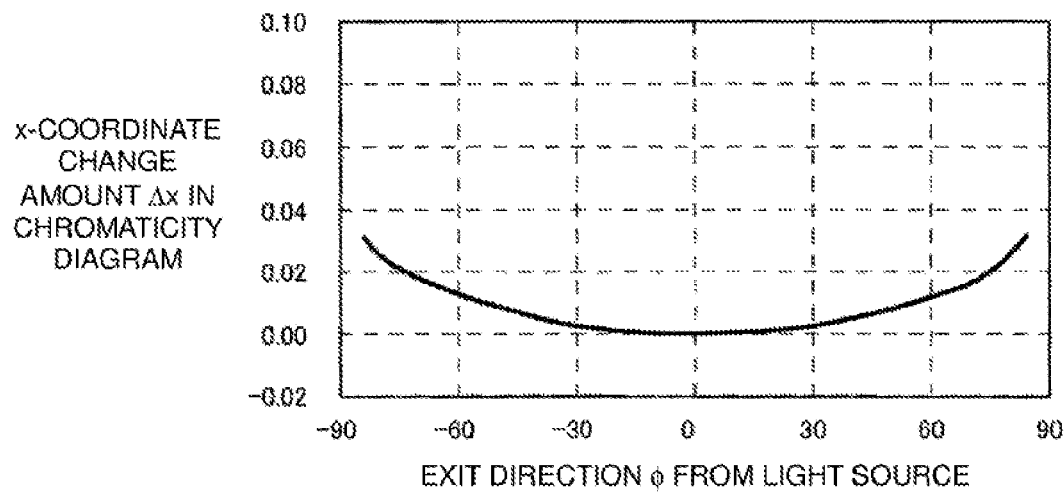
FIG. 2A is a view illustrating a relationship between an exit direction φ of light emitted from a light source and an x-coordinate in a CIE xy chromaticity diagram.
Figure 2B:
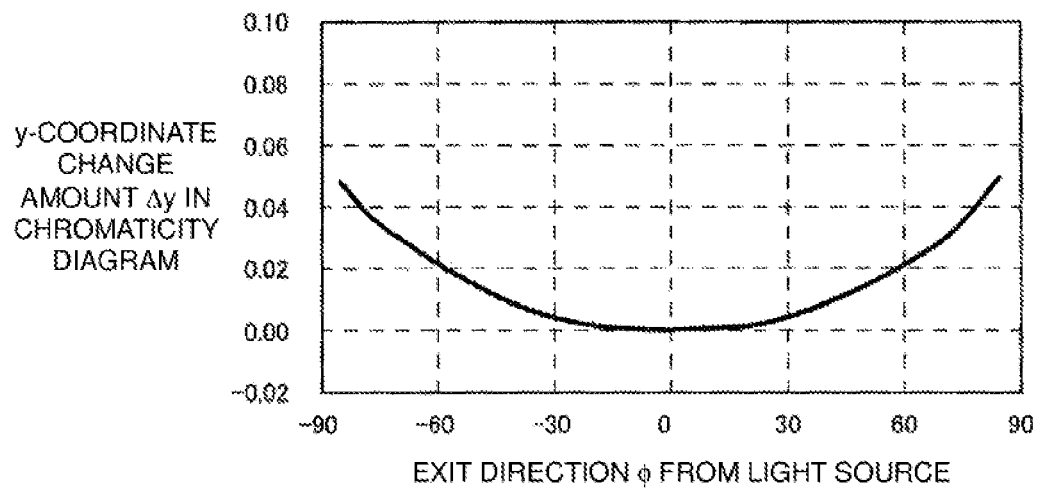
FIG. 2B is a view illustrating a relationship between the exit direction φ of the light emitted from the light source and an y-coordinate in the CIE xy chromaticity diagram.
Figure 2C:
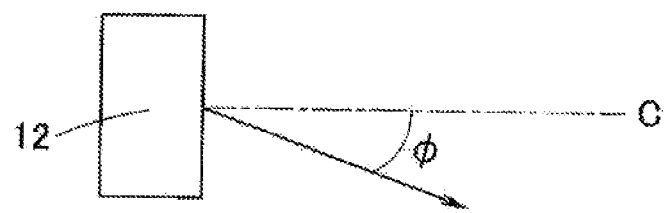
FIG. 2C is a view illustrating the exit direction φ of the light emitted from the light source.
Figure 3:
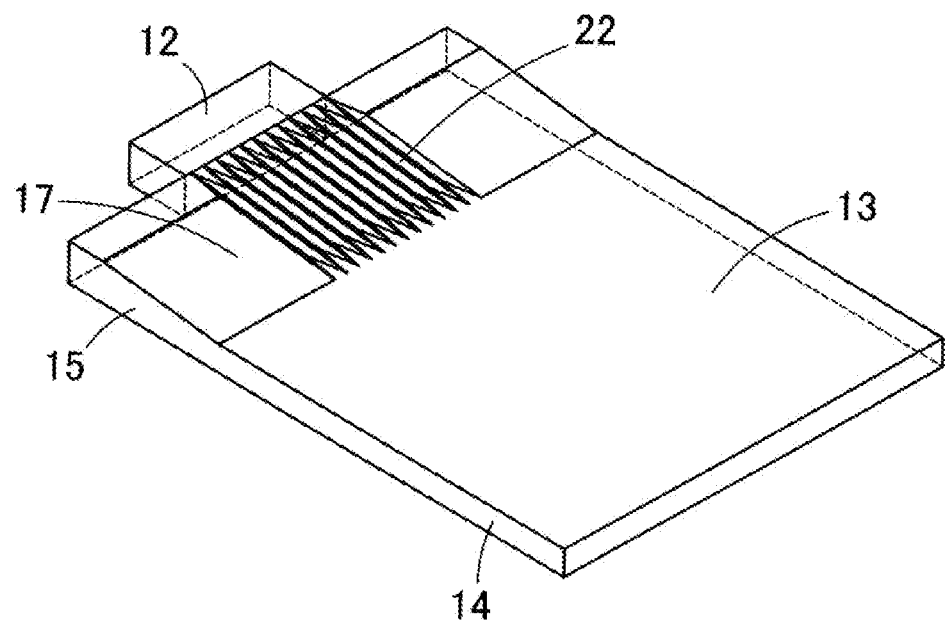
FIG. 3 is a perspective view of a surface illumination device disclosed in International Patent Publication No. WO2010/070821.
Figure 4:
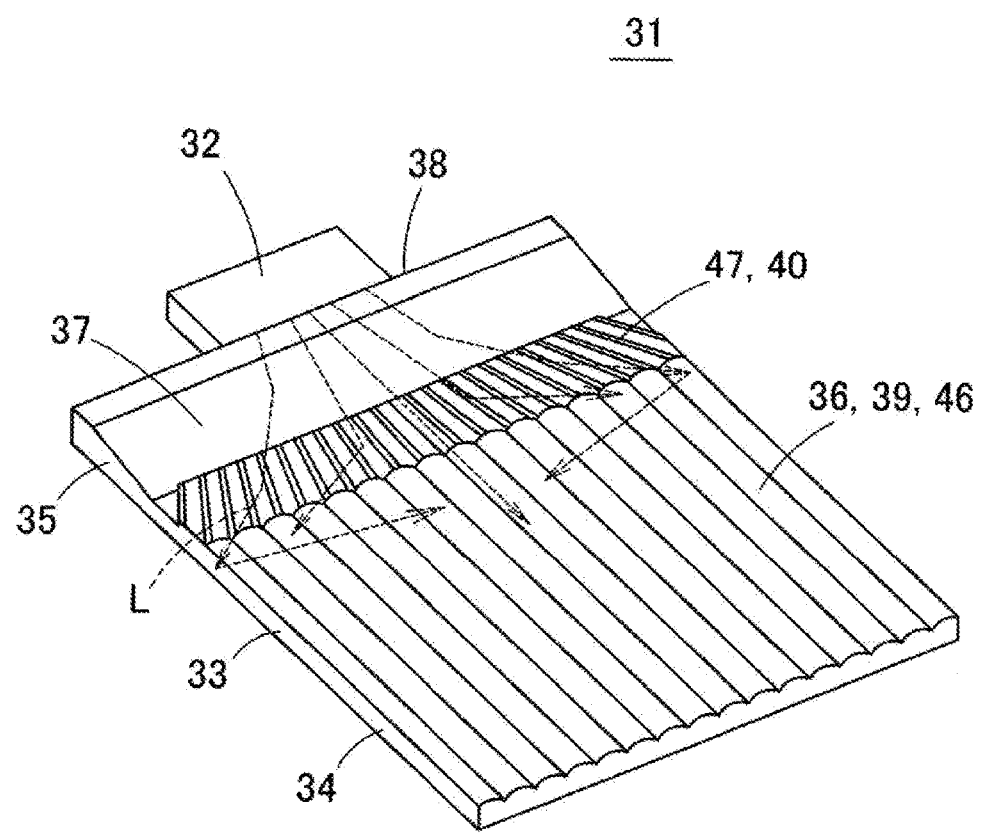
FIG. 4 is a perspective view of a surface illumination device according to a first embodiment of the present invention.
Figure 5:
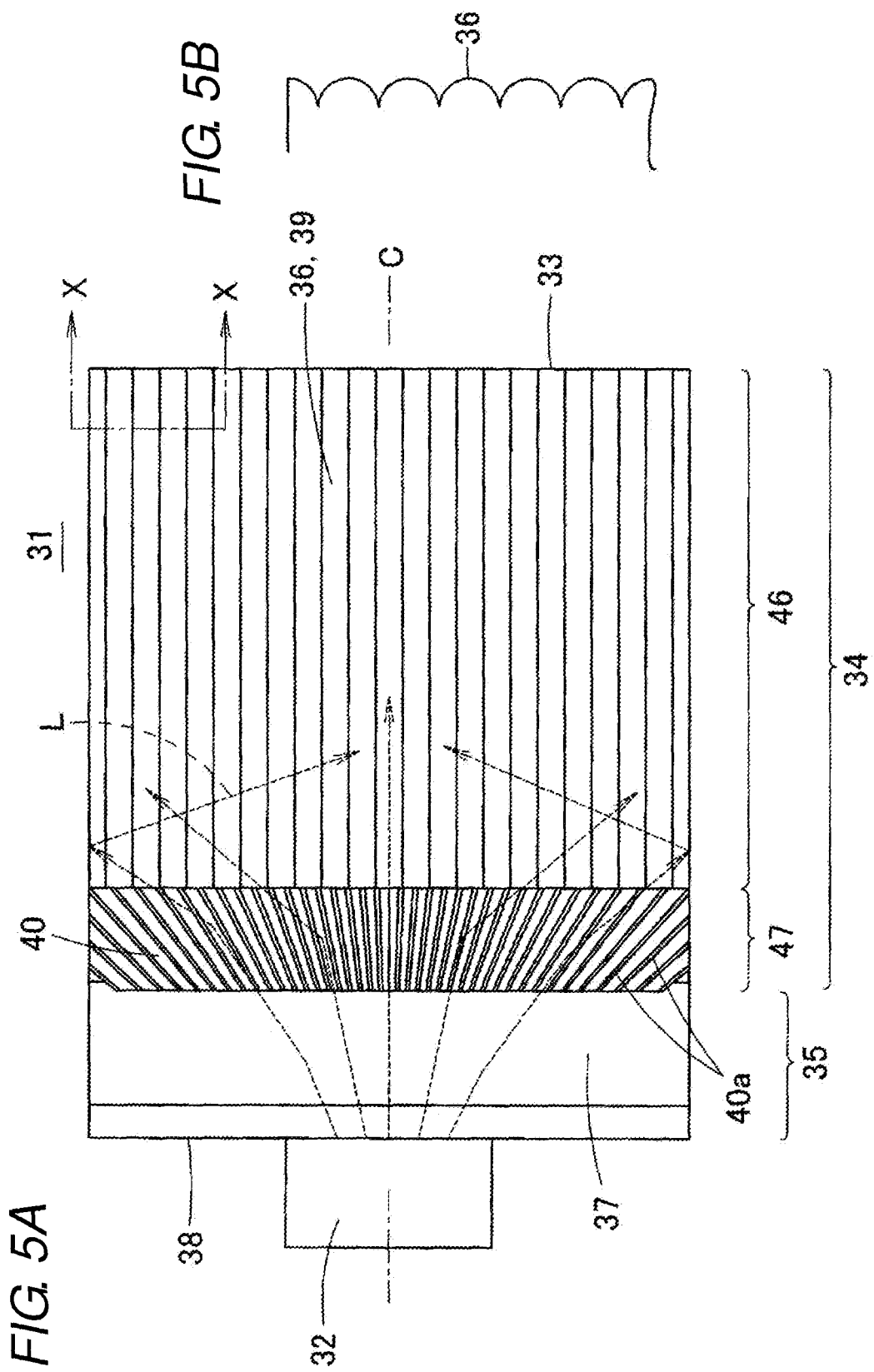
FIG. 5A is a plan view of the surface illumination device in FIG. 4.
FIG. 5B is an enlarged view illustrating a section of a line X-X in FIG. 5A, and illustrating a cross sectional shape of a lenticular lens.
Figure 6:
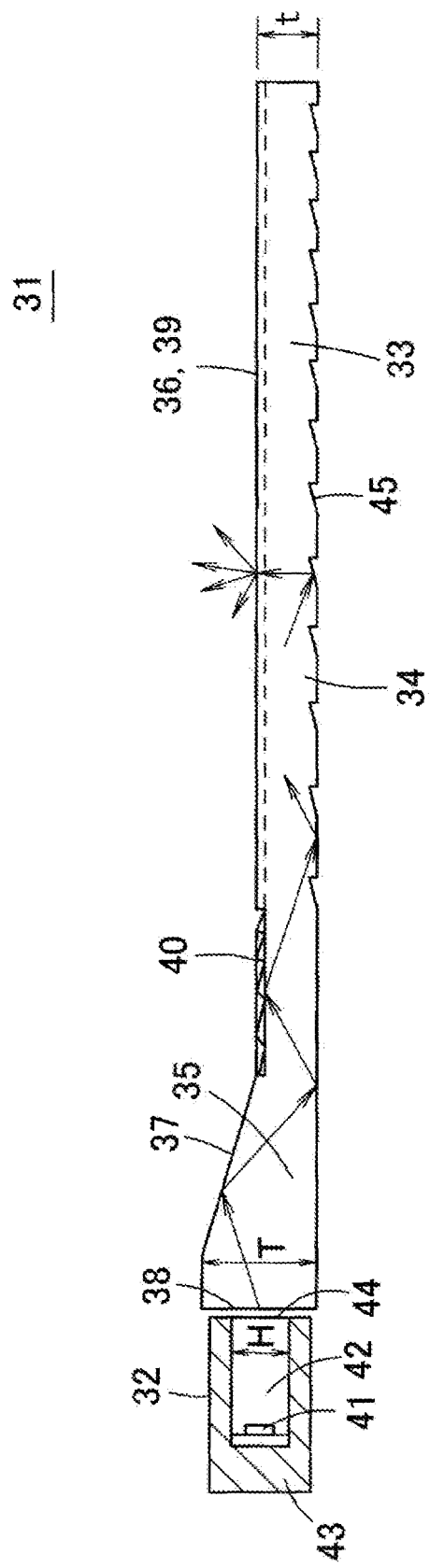
FIG. 6 is a schematic sectional view of the surface illumination device in FIG. 4.
Figure 7:
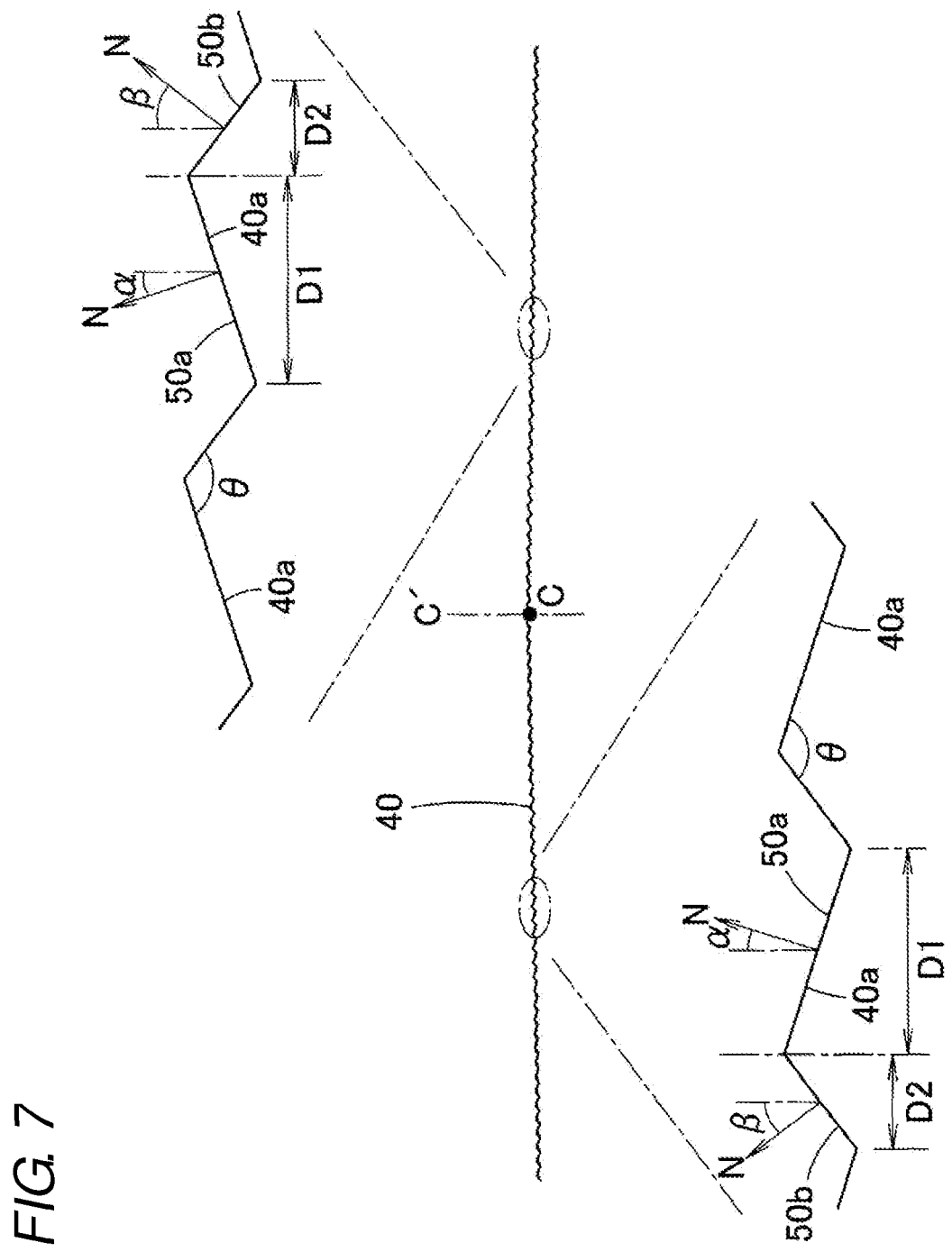
FIG. 7 is a sectional view illustrating the shape of a directivity conversion pattern in the section parallel to a light incident surface and an enlarged part of the directivity conversion pattern.
Figure 8:
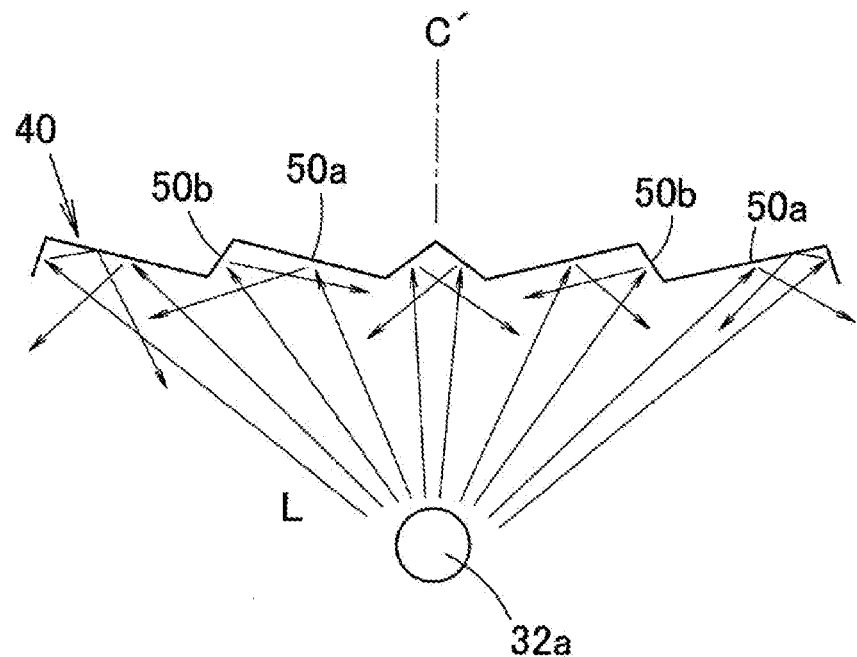
FIG. 8 is an explanatory view of action of the directivity conversion pattern in FIG. 7.

A surface illumination device 31 according to a first embodiment of the present invention will be described below with reference to FIGS. 4 to 8. FIG. 4 is a perspective view illustrating the surface illumination device 31 of the first embodiment, and FIG. 5A is a plan view of the surface illumination device 31. FIG. 5B is a sectional view taken on a line X-X in FIG. 5A, and illustrates an enlarged section of a lenticular lens 36 provided in a surface of a light guide plate 33. FIG. 6 is a schematic sectional view along a vertical direction of the surface illumination device 31, and illustrates a behavior of a ray in a plane perpendicular to a light incident surface 38 and a light exit surface 39 of the light guide plate 33. FIG. 7 is a view illustrating a directivity conversion pattern 40 in a section parallel to the light incident surface 38 of the light guide plate 33, and illustrates an enlarged part of the directivity conversion pattern 40. FIG. 8 illustrates the behavior of the ray reflected by the directivity conversion pattern.

The surface illumination device 31 includes a point light source 32 (a light source) and the light guide plate 33. The point light source 32 includes one or a plurality of LEDs, and emits white light. As illustrated in FIG. 6, an LED 41 is sealed in a transparent sealing resin 42, the transparent sealing resin 42 except a front surface is covered with a white resin 43, and the front surface exposed from the white resin 43 of the transparent sealing resin 42 constitutes a light exit window 44 (an emission surface). The point light source 32 is smaller than a width of the light guide plate 33, and is called a point light source while a cold-cathode tube is called a linear light source.

In the light guide plate 33, a light introduction unit 35 is provided in an end face of a thin light guide plate body 34 so as to be continuously connected to the light guide plate body 34. The light guide plate 33 is integrally molded using high-refractive-index transparent resins such as an acrylic resin, a polycarbonate resin (PC), a cycloolefin material, and polymethylmethacrylate (PMMA).

The light introduction unit 35 is a thick portion having a substantial wedge shape in the light guide plate 33, and the point light source 32 is disposed while opposed to a part of the light incident surface 38 that is of the end face. Because a thickness T of the end face of the light introduction unit 35 is greater than or equal to a height H of the light exit window 44, the light emitted from the point light source 32 is efficiently incident to the light introduction unit 35 from the light incident surface 38 to enhance light use efficiency of the surface illumination device 31.

An inclined surface 37 is formed in the upper surface (the surface on the side identical to that of the light exit surface 39 of the light guide plate body 34) of the light introduction unit 35. The inclined surface 37 is inclined toward an end of the light guide plate body 34 from a maximum thickness portion near the light incident surface 38. The belt-like inclined surface 37 extends to one of side surfaces of the light guide plate 33 from the other side surface. The inclined surface 37 is smoothly formed in the surface illumination device 31 of the first embodiment.

The light guide plate body 34 constitutes most part of the light guide plate 33, and a thickness t of the light guide plate body 34 is less than the maximum thickness T of the light introduction unit 35, thereby achieving the thinner light guide plate 33. The light guide plate body 34 has a plate-like shape in which the surface and the rear surface are parallel to each other, and the light guide plate body 34 has the substantially even thickness. As illustrated in FIG. 5A, most part of the light guide plate body 34 constitutes an effective illumination region 46, and an end portion region adjacent to the light introduction unit 35 constitutes a pattern formation region 47.

The effective illumination region 46 exits the light having even luminance, and corresponds to a liquid crystal panel display region laid on the surface illumination device 31. The upper surface of the effective illumination region 46 constitutes the light exit surface 39, and the lenticular lens 36 is formed on the light exit surface 39 of the effective illumination region 46. As illustrated in FIGS. 5A and 5B, the lenticular lens 36 is formed by arraying convex lenses extending in parallel with the longitudinal direction of the light guide plate body 34 are laterally, and the lenticular lens 36 functions to laterally spread the directional pattern of the light exiting from the light exit surface 39. The surface illumination device 31 includes a light exit part 45 on the opposite surface (the lower surface) to the light exit surface 39 of the effective illumination region 46. A pattern having a triangular groove shape is illustrated as the light exit part 45 in FIG. 6. Alternatively, a pattern to which sandblasting is performed, a pattern to which photographic printing is performed using a diffusion ink, a diffraction grating pattern, and any irregular pattern may be used as the light exit part 45. The light exit part 45 may be provided in the light exit surface 39 of the light guide plate body 34, or in both the light exit surface 39 and the opposite surface to the light exit surface 39.

The pattern formation region 47 is a belt-like region, which is located in the end portion of the light guide plate body 34 and between the end (a lower end of the inclined surface 37) of the light introduction unit 35 and the end of the effective illumination region 46. The directivity conversion pattern 40 is provided in the upper surface and/or the lower surface of the pattern formation region 47. As illustrated in FIGS. 5A and 7, a plurality of pattern elements 40a having the V-groove shape are radially arrayed in the directivity conversion pattern 40. When viewed from the direction perpendicular to the light exit surface 39, each pattern element 40a, and is inclined with respect to a virtual straight line (hereinafter referred to as an optical axis C of the point light source 32) perpendicular to the light incident surface 38 and passing through an emission center of the point light source 32, and the inclined directions of the pattern elements 40a are opposite to each other with respect to the optical axis C. An angle formed by each pattern element 40a and the optical axis C increases with distance from the optical axis C.

In the drawings, optical patterns of the lenticular lens 36 and the directivity conversion pattern 40 are coarsely drawn for the sake of convenience. However, actually the lenticular lens 36 and the directivity conversion pattern 40 are fine patterns of the order of a micrometer. The region where the directivity conversion pattern 40 is provided may be shorter than the pattern formation region 47, and the end portion of the lenticular lens 36 may invade into the pattern formation region 47.

As illustrated in FIG. 7, each pattern element 40a is formed by two slopes in which inclined angles and inclined directions differ from each other in a section parallel to the light incident surface 38, and the pattern element 40a is formed into the V-groove shape asymmetric with respect to the straight line, which passes through a valley line (a lowest point) and is perpendicular to the light exit surface 39. Accordingly, the slopes having the different inclined directions are alternately arrayed in the directivity conversion pattern 40.

A cross sectional shape of the directivity conversion pattern 40 has the following feature. Assuming that a normal N normal to the slope of each pattern element 40a toward the outside from the inside of the light guide plate 33 in the cross section parallel to the light incident surface 38, a summation of widths D1 of slopes 50a (hereinafter referred to as inward-normal slopes 50a) in each of which the normal N is inclined to the side of a perpendicular C' orthogonal to the optical axis C is greater than a summation of widths D2 of slopes 50b (hereinafter referred to as outward-normal slopes 50b) in each of which the normal N is inclined to the opposite side to the perpendicular C'. However, each of the summation of the widths D1 of the inward-normal slopes 50a and the summation of the widths D2 of the outward-normal slopes 50b is separately computed in the right and left regions of the optical axis C, and the summation of the widths D1 of the inward-normal slopes 50a is greater than the summation of the widths D2 of the outward-normal slopes 50b on both the sides of the optical axis C. Particularly, in an example in FIG. 7, for the slopes 50a and 50b adjacent to each other at any place, the width D1 of the inward-normal slope 50a is greater than the width D2 of the outward-normal slope 50b.

In the surface illumination device 31, as indicated by an arrow in FIG. 6, the light emitted from the point light source 32 is incident to the light introduction unit 35 from the light incident surface 38, is reflected by the upper surface or the lower surface of the light introduction unit 35 or transmitted through the light introduction unit 35, and is guided to the thin light guide plate body 34. The light introduced to the light guide plate body 34 is guided in the light guide plate body 34 while reflected by the directivity conversion pattern 40, the lenticular lens 36, and the lower surface of the light guide plate body 34, and the light is reflected or diffused by the light exit part 45 to exit substantially evenly from the light exit surface 39.

At this point, as illustrated in FIGS. 4 and 5, light L is reflected by the directivity conversion pattern 40 and bent such that the angle formed by the light L and the optical axis C increases, and the directional pattern of the light L which is incident to the directivity conversion pattern 40 is spread to the width direction of the light guide plate 33.

FIG. 8 is a schematic diagram illustrating a behavior of the light reflected by the directivity conversion pattern 40, and illustrates part of the cross section, which is parallel to the light incident surface 38, in the directivity conversion pattern 40. Because the directivity conversion pattern 40 has the above configuration, as illustrated in FIG. 8, an area of the slope 50b to which the light L exiting in the oblique direction from an emission center 32a is incident at a substantially right angle is reduced, and the light L hardly leaks from the slope 50b.

The light L incident to the slope 50a from the emission center 32a is reflected such that the angle formed by the light L reflected and the optical axis C increases outward, and the area of the slope 50a is enlarged in the directivity conversion pattern 40. Therefore, an amount of outwardly-reflected light increases, and the directional pattern of the light L is spread to the width direction of the light guide plate 33 as illustrated in FIG. 5A. Even if the color of the light emitted from the point light source 32 changes depending on the exit direction, the pieces of light having the different colors are incident to the light guide plate 33, are reflected by the directivity conversion pattern 40, and mix with each other. Specifically, as illustrated in FIGS. 4 and 5A, part of the light exiting to the central portion (in front of the point light source 32) of the light guide plate 33 is reflected by the directivity conversion pattern 40 and guided to both the side end portions of the light guide plate 33, and part of the light exiting to both the side end portions of the light guide plate 33 is reflected by the side surface of the light guide plate 33 and guided to the central portion of the light guide plate 33, whereby the pieces of light having the different colors mix with each other in the whole of the light guide plate 33. As a result, the color unevenness between the central portion and both the side end portions of the light guide plate 33 can be reduced in the light exit surface 39.

Figure 9:
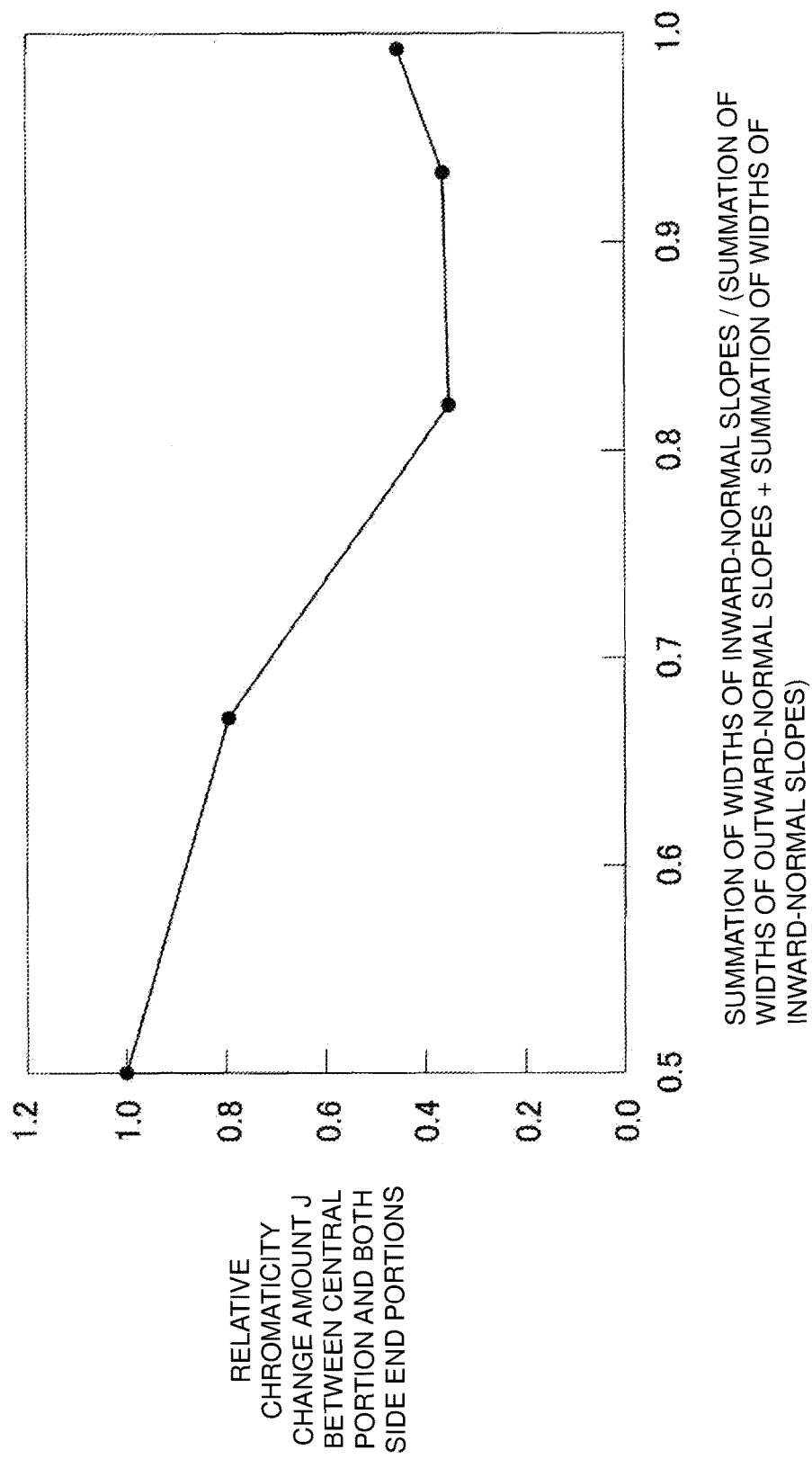
FIG. 9 is a simulation diagram illustrating a relationship between a ratio of a summation of widths of inward-normal slopes to the summation of the widths of the inward-normal slopes and a summation of widths of outward-normal slopes and an amount of change of a relative chromaticity between a central portion and both side end portions.
Figure 10:
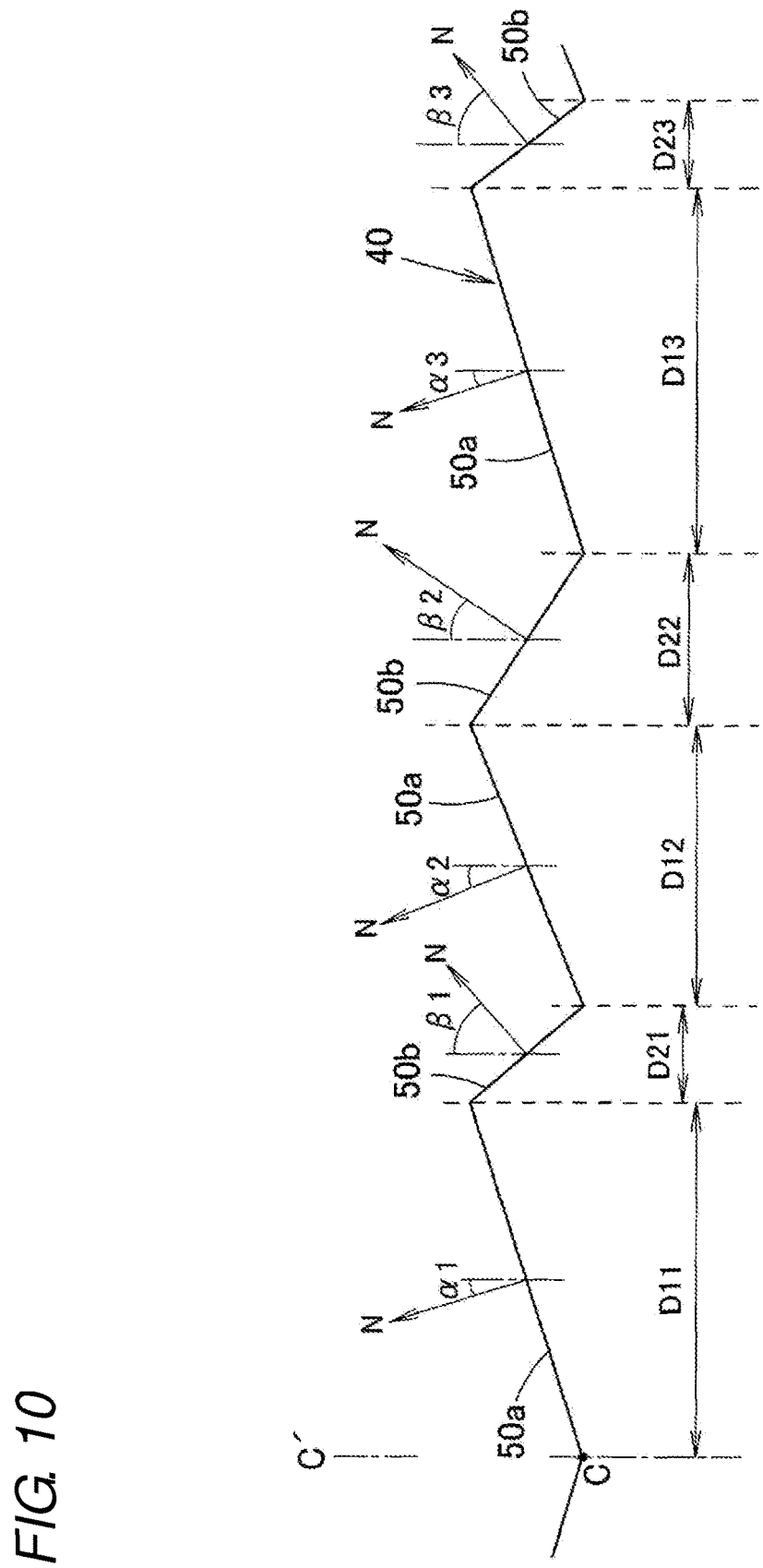
FIG. 10 is a view illustrating a method for obtaining the summation of the widths of the inward-normal or outward-normal slopes and an average angle of the inward-normal or outward-normal slopes.

FIG. 9 is a simulation diagram illustrating a relationship between a ratio of the summation of the widths D1 of the inward-normal slopes 50a and an amount of change of a relative chromaticity J between the central portion and both the side end portions. In FIG. 9, the horizontal axis expresses a ratio k (=ΣD1/(ΣD1+ΣD2)) of the summation (ΣD1) of the widths D1 of the inward-normal slopes 50a to the summation of the widths D1 of the inward-normal slopes 50a and the summation (ΣD2) of the widths D2 of the outward-normal slopes 50b. Referring to FIG. 10, assuming that D1i (i is an index added to each inward-normal slope 50a) is the width in the horizontal direction of the inward-normal slopes 50a, the summation of the widths D1 of the inward-normal slopes 50a is expressed by $$\Sigma D1i.$$

The summation of D1i is separately computed for the slopes 50a in the right or left region of the optical axis C. Similarly, assuming that D2j (j is an index added to each outward-normal slope 50b) is the width in the horizontal direction of the outward-normal slopes 50b, the summation of the widths D2 of the outward-normal slopes 50b is expressed by $$\Sigma D2j.$$

The summation of D2j is separately computed for the slopes 50b in the right or left region of the optical axis C.

FIG. 9 also illustrates the amount of change of the relative chromaticity J between the central portion and both the side end portions. The amount of change of the relative chromaticity J between the central portion and both the side end portions is defined as follows. In the case that k is the ratio of the summation of the widths D1 of the inward-normal slopes 50a, it is assumed that xo(k) and yo(k) are the color of the light in the central portion of the light guide plate in terms of an x-coordinate and a y-coordinate of the chromaticity diagram. It is assumed that xs(k) and ys(k) are the color of the light in both the side end portions of the light guide plate in terms of the x-coordinate and the y-coordinate of the chromaticity diagram. In the case that k is the ratio of the summation of the widths D1 of the inward-normal slopes 50a, an amount of change of a chromaticity Jk is defined by the following mathematical formula 1. The mathematical formula 1 expresses a distance between the color of the light in the central portion of the light guide plate and the color of the light in both the side end portion of the light guide plate on the chromaticity diagram.

[Mathematical formula 1]

$$Jk=\sqrt{(xs(k)-xo(k))^2+(ys(k)-yo(k))^2} \quad \text{(mathematical formula 1)}$$

The amount of change of the relative chromaticity J between the central portion and both the side end portions, which is expressed on the vertical axis in FIG. 9 is the ratio of the amount of change of the chromaticity Jk in the case that k is the ratio of the summation of the widths D1 of the inward-normal slopes 50a to an amount of change of a chromaticity J0.5 between the central portion and both the side end portions in the case that the section of the pattern element 40a is horizontally symmetric (k=0.5). That is, $$J=Jk/J0.5$$

is obtained.

Referring to FIG. 9, when the ratio k (=$\Sigma D1/(\Sigma D1+\Sigma D2)$) of the summation of the widths D1 of the inward-normal slopes 50a to the summation of the widths D1 of the inward-normal slopes 50a and the summation of the widths D2 of the outward-normal slopes 50b is greater than 0.5, the amount of change of the relative chromaticity J between the central portion and both the side end portions is less than 1.0. The amount of change of the relative chromaticity J between the central portion and both the side end portions is equal to 1.0 when a countermeasure against the color unevenness is not taken. Therefore, it is found that the color unevenness between the central portion and both the side end portions of the light guide plate 33 is effectively improved when the ratio k of the summation of the widths D1 of the inward-normal slopes 50a is greater than 0.5. Particularly, the effect that improves the color unevenness is maximized in the region where the ratio ($\Sigma D1/(\Sigma D1+\Sigma D2)$) of the summation of the widths D1 of the inward-normal slopes 50a to the summation of the widths D1 of the inward-normal slopes 50a and the summation of the widths D2 of the outward-normal slopes 50b ranges from 0.8 to 0.9.

The feature of the cross sectional shape of the directivity conversion pattern 40 can also be expressed as follows. An average angle of an angle β (or the inclined angle of the slope 50b) formed by the normal N of the outward-normal slope 50b and the perpendicular C' is greater than an average angle of an angle α (or the inclined angle of the slope 50a) formed by the normal N of the inward-normal slope 50a and the perpendicular C'. As illustrated in FIG. 10, the average angle of the angle α formed by the normal N of the inward-normal slope 50a and the perpendicular C' is defined by $$\Sigma \alpha i \times D1i/\Sigma D1i.$$

Where αi is the angle formed by each normal N of the inward-normal slope 50a and the perpendicular C', and D1i is the width of each slope 50a (i is the index added to each inward-normal slope 50a). At this point, the summations of denominators and numerators are separately computed for the slopes 50a in the right or left region of the optical axis C. Similarly, the average angle of the angle β formed by the normal N of the outward-normal slope 50b and the perpendicular C' is defined by $$\Sigma \beta j \times D2j/\Sigma D2j.$$

Where βj is the angle formed by each normal N of the outward-normal slope 50b and the perpendicular C', and D2j is the width of each slope 50b (j is the index added to each outward-normal slope 50b). At this point, the summations of the denominators and numerators are separately computed for the slopes 50b in the right or left region of the optical axis C. The average angles are separately compared in the right or left region of the optical axis C. Particularly, in the example in FIG. 7, for the slopes 50a and 50b adjacent to each other at any place, the angle β formed by the normal N of the outward-normal slope 50b and the perpendicular C' is greater than the angle α formed by the normal N of the inward-normal slope 50a and the perpendicular C'.

Figure 11:
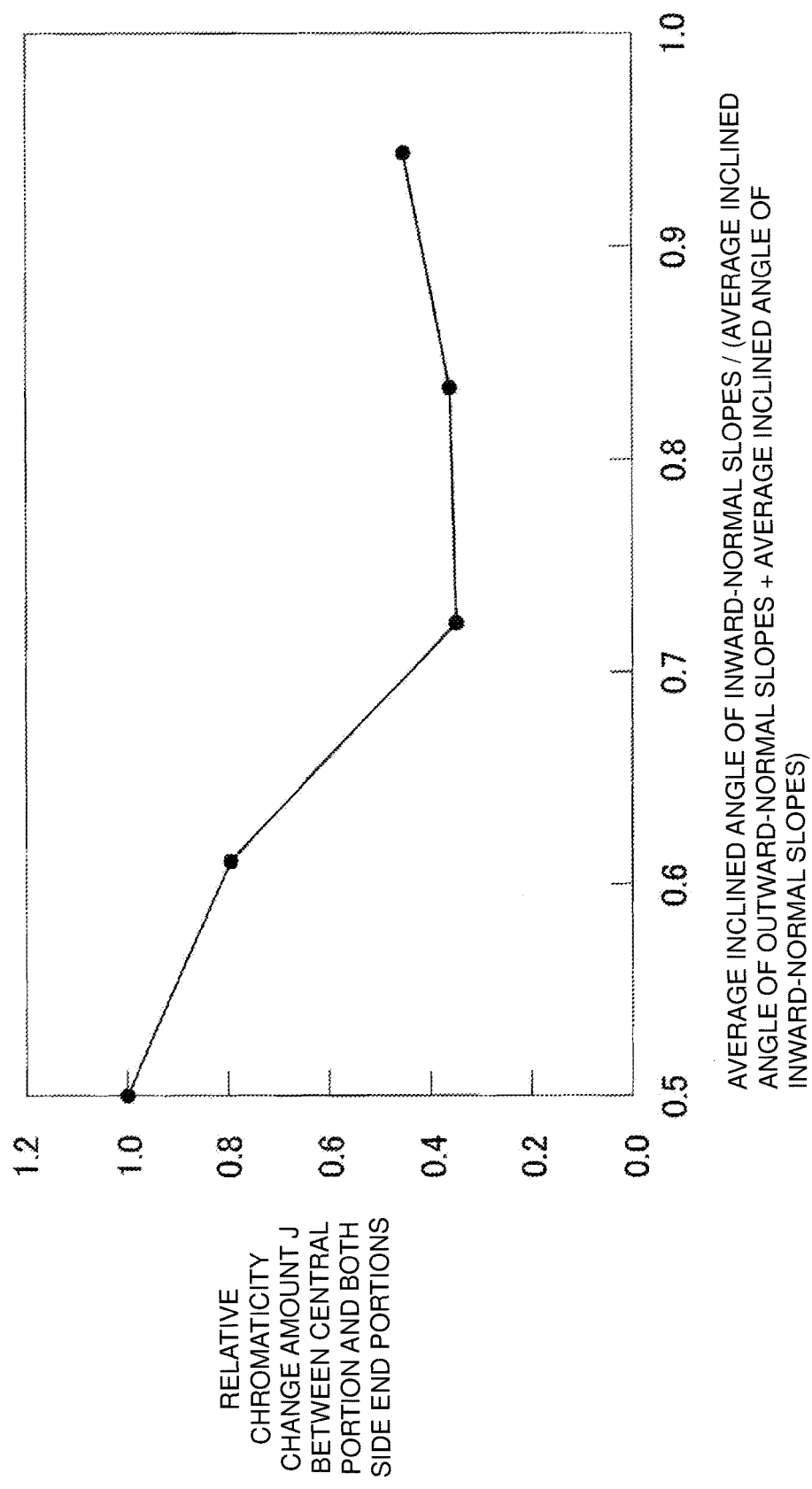
FIG. 11 is a simulation diagram illustrating a relationship between a ratio of an average angle of an angle formed by a normal to the outward-normal slope and a perpendicular to the sum of the average angle of the angle formed by the normal to the outward-normal slope and the perpendicular and an average angle of an angle formed by a normal to the inward-normal slope and a perpendicular and the amount of change of the relative chromaticity between the central portion and both the side end portions.

FIG. 11 is a simulation diagram illustrating a relationship between the ratio of the average angle of the angle formed by the normal N of the outward-normal slopes 50b and the perpendicular C', and an amount of change of a relative chromaticity J between the central portion and both the side end portions. In FIG. 11, the horizontal axis expresses the ratio of the average angle of the angle formed by the normal N of the outward-normal slope 50b and the perpendicular C' to the sum of the average angle of the angle formed by the normal N of the outward-normal slope 50b and the perpendicular C' and the average angle of the angle formed by the normal N of the inward-normal slope 50a and the perpendicular C'. In FIG. 11, the vertical axis expresses the amount of change of the relative chromaticity J between the central portion and both the side end portions.

Referring to FIG. 11, when the ratio of the average angle of the angle formed by the normal N of the outward-normal slope 50b and the perpendicular C' to the sum of the average angle of the angle formed by the normal N of the outward-normal slope 50b and the perpendicular C' and the average angle of the angle formed by the normal N of the inward-normal slope 50a and the perpendicular C' is greater than 0.5, the amount of change of the relative chromaticity J between the central portion and both the side end portions is less than 1.0, and it is found that the color unevenness between the front region of the light source and both the side end portions of the light guide plate is effectively improved. Particularly, the effect that improves the color unevenness is maximized in the region where the ratio of the average angle of the angle formed by the normal N of the outward-normal slope 50*b* and the perpendicular C' to the sum of the average angle of the angle formed by the normal N of the outward-normal slope 50*b* and the perpendicular C' and the average angle of the angle formed by the normal N of the inward-normal slope 50*a* and the perpendicular C' ranges from 0.7 to 0.8.

Figure 12:
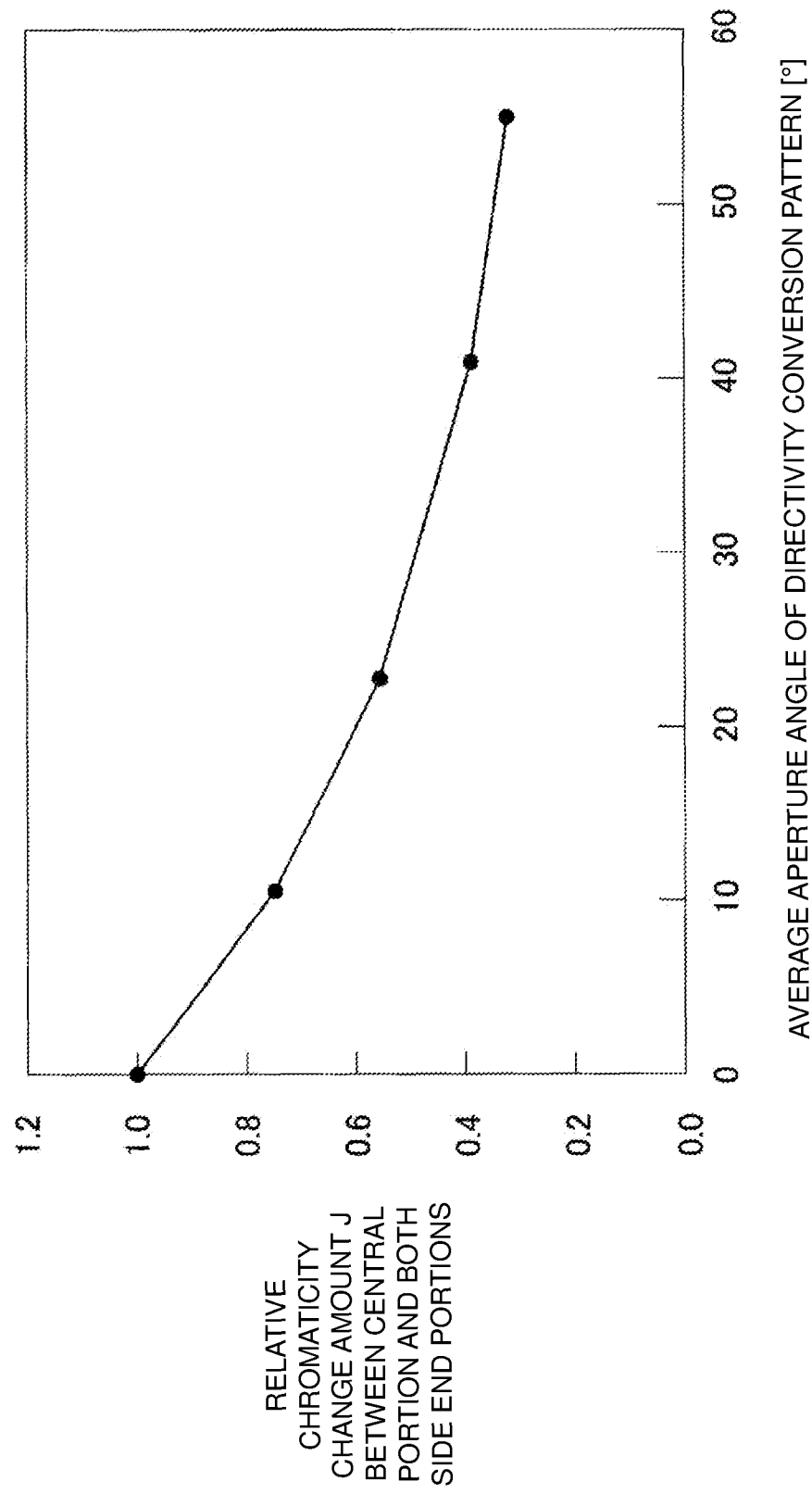
FIG. 12 is a view illustrating a simulation result of a relationship between an average aperture angle of the directivity conversion pattern and the amount of change of the relative chromaticity between the central portion and both the side end portions.
Figure 13:
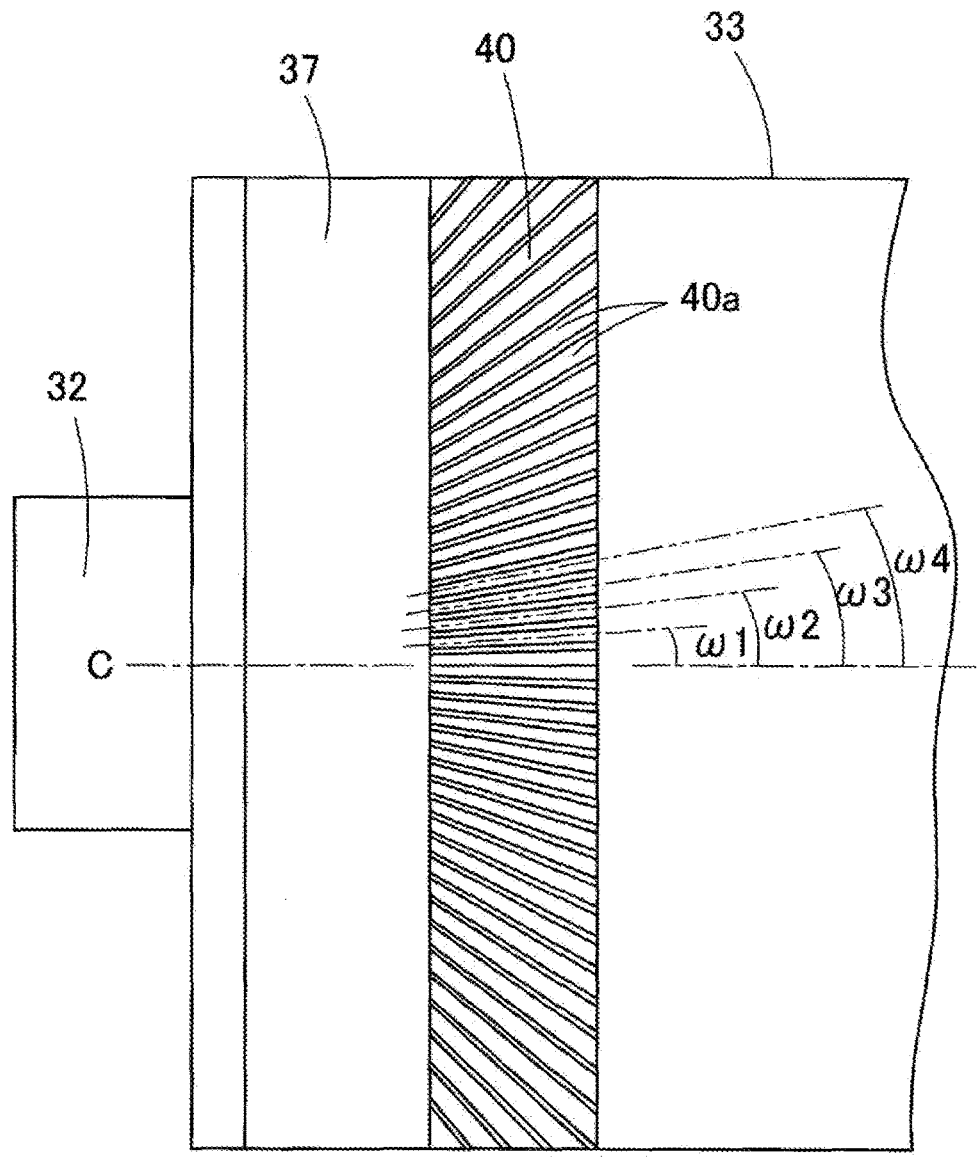
FIG. 13 is a view illustrating the average aperture angle of the directivity conversion pattern.

An average aperture angle of the directivity conversion pattern 40 will be described below. FIG. 12 illustrates a simulation result of a relationship between the average aperture angle of the directivity conversion pattern 40 and the amount of change of the relative chromaticity J between the central portion and both the side end portions. In FIG. 12, the horizontal axis expresses the average aperture angle of the directivity conversion pattern 40, and the vertical axis expresses the amount of change of the relative chromaticity J between the central portion and both the side end portions. As used herein, the average aperture angle of the directivity conversion pattern 40 means an arithmetic average of gradients $\omega 1$, $\omega 2$, $\omega 3$, . . . of the extending directions of the pattern elements 40*a* with respect to the optical axis C in one of the right and left regions, in the case that the directivity conversion pattern 40 is divided into the right and left regions with respect to the optical axis C as illustrated in FIG. 13 when viewed from the direction perpendicular to the light exit surface 39 of the light guide plate 33. As can be seen from FIG. 12, when the average aperture angle of the directivity conversion pattern 40 is greater than 0° (that is, when the pattern elements 40*a* are not parallel to each other), the light mixing effect is enhanced between the front region of the point light source 32 and both the side end portions of the light guide plate 33, and the color unevenness can be reduced in the front region of the point light source 32 and both the side end portions of the light guide plate 33. Desirably the average aperture angle of the directivity conversion pattern 40 is less than or equal to 55° in consideration of luminance efficiency of the surface illumination device 31.

Figure 14:
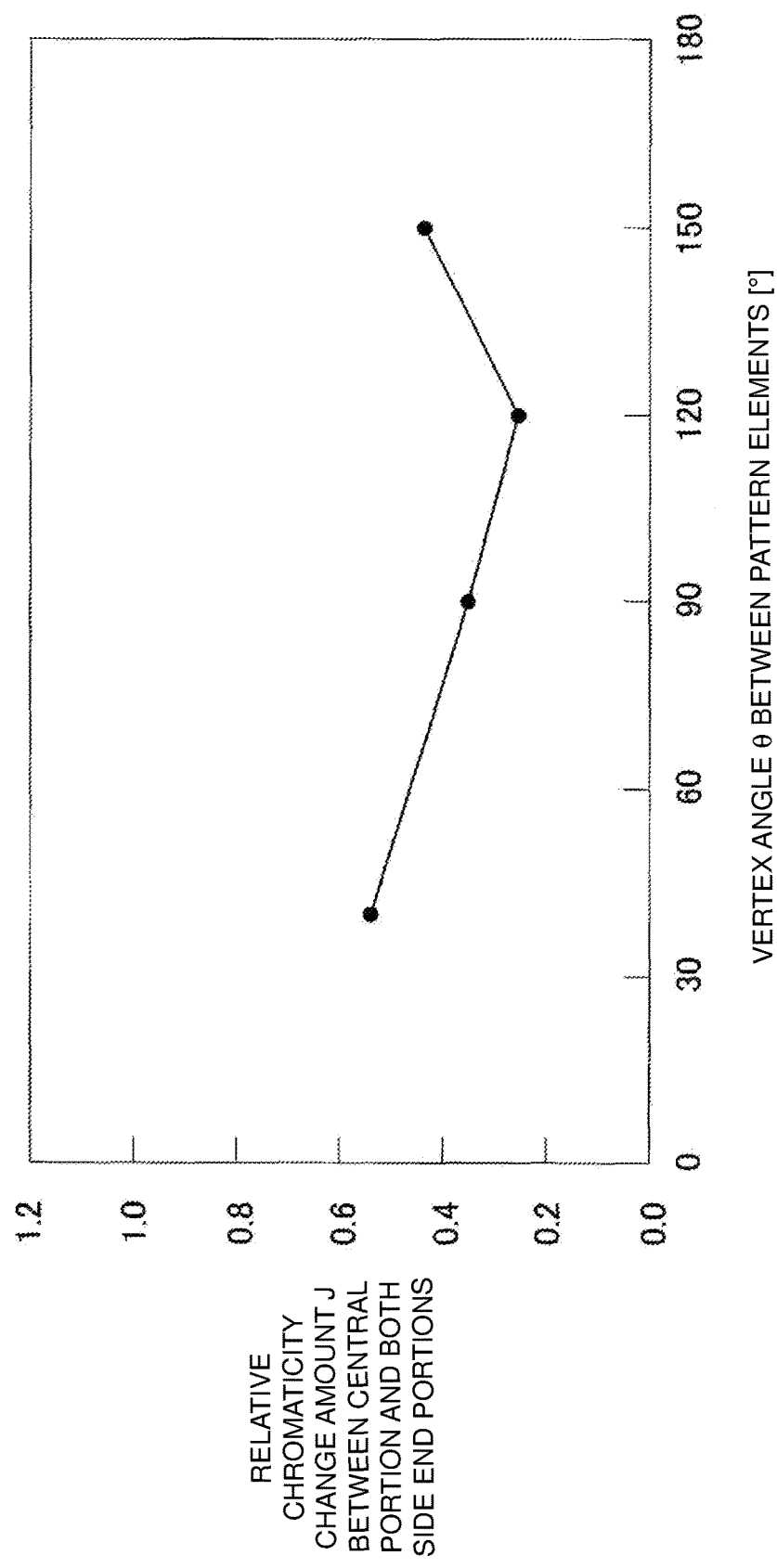
FIG. 14 is a simulation diagram illustrating a relationship between a vertex angle θ between pattern elements and the amount of change of the relative chromaticity between the central portion and both side end portions.

Desirably a vertex angle $\theta$ (see FIG. 7) formed between the pattern elements 40*a* adjacent to each other in the directivity conversion pattern 40 ranges from 50° to 150°. FIG. 14 illustrates a simulation result indicating the reason the vertex angle $\theta$ ranges from 50° to 150°. FIG. 14 is a simulation diagram illustrating a relationship between the vertex angle $\theta$ between the pattern elements 40*a* and the amount of change of the relative chromaticity J between the central portion and both the side end portions. In FIG. 14, the horizontal axis expresses the vertex angle $\theta$ between the pattern elements 40*a*, and the vertical axis expresses the amount of change of the relative chromaticity J between the central portion and both the side end portions. As can be seen from FIG. 14, the amount of change of the relative chromaticity J between the central portion and both the side end portions decreases in the substantially whole region where the vertex angle is less than 180°, and the color unevenness between the front region of the point light source 32 and both the side end portions of the light guide plate 33 is improved. Particularly, the effect is maximized at the vertex angle $\theta$ of 120°. Desirably the vertex angle $\theta$ ranges from 50° to 150° in consideration of the luminance efficiency of the surface illumination device 31.

In the case that the pattern element 40*a* is not formed into the V-groove shape (in the case in FIG. 15D or 15E), a triangle is approximated by connecting a certain ridge line and a valley line adjacent to the ridge line using the straight line in the cross section parallel to the light incident surface 38 of the directivity conversion pattern 40, and a vertex angle at a vertex of the triangle may be used as the vertex angle between the pattern elements 40*a*.

Because the directivity conversion pattern 40 may be disposed while inclined on both the sides of the optical axis C, there is no particular limitation to the cross sectional shape of the directivity conversion pattern 40. For example, as illustrated in FIG. 15A, the pattern elements 40*a* having the horizontally asymmetric cross sectional shape are repeatedly arrayed in the right and left regions. In FIG. 15B, the pattern element 40*a* having the horizontally asymmetric cross sectional shape are arrayed in the right and left regions while gradually deformed. As illustrated in FIG. 15C, the pattern elements 40*a* having the horizontally symmetric V-groove cross sectional shape may repeatedly be arrayed. The vertex portion of the directivity conversion pattern 40 may be curved as illustrated in FIG. 15D, or the pattern elements 40*a* having the polygonal cross sectional shape may be arrayed as illustrated in FIG. 15E.

Figure 16A:
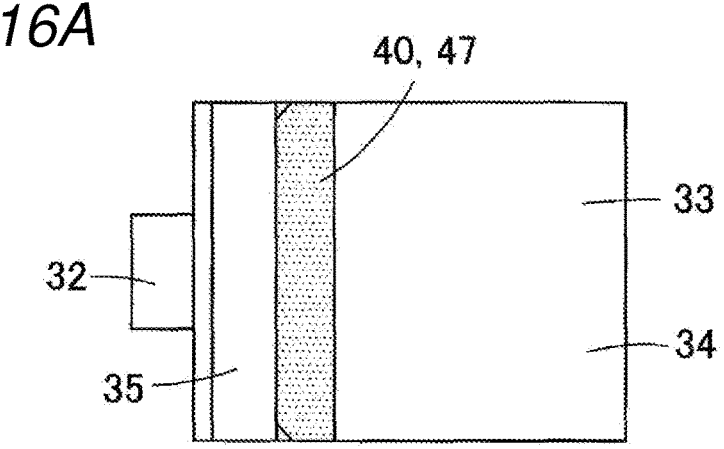
FIGS. 16A to 16D are schematic diagrams illustrating various shapes of pattern formation regions in each of which the directivity conversion pattern is formed.
Figure 16B:
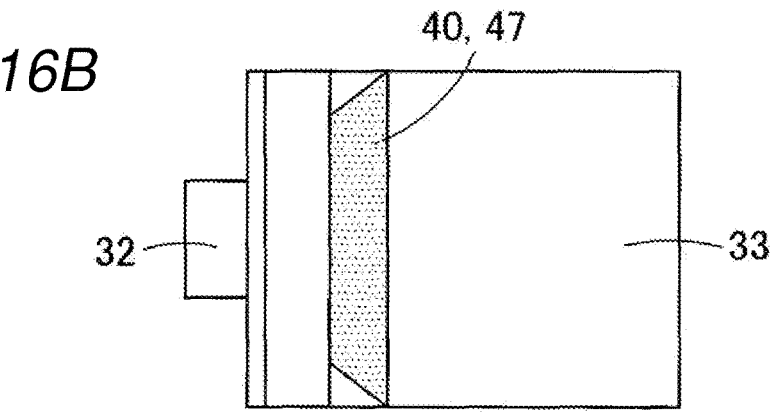
Figure 16C:
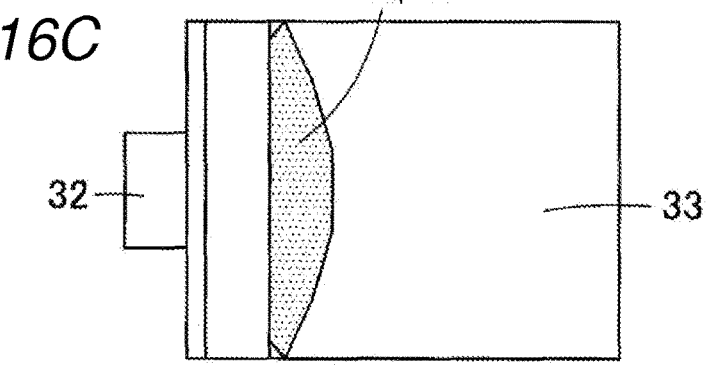
Figure 16D:
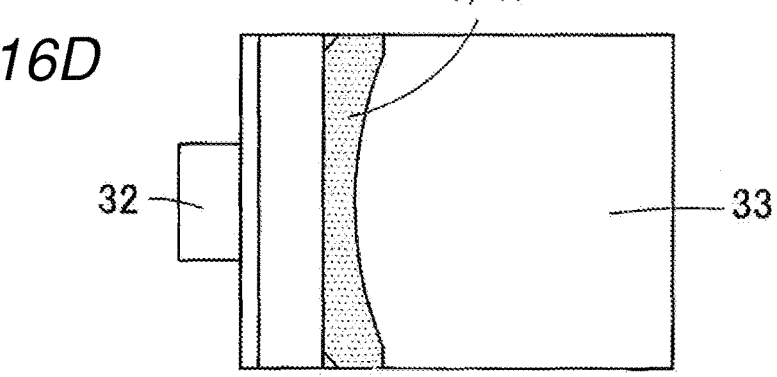

The region (the pattern formation region 47) where the directivity conversion pattern 40 is provided may be formed into various shapes. For example, as illustrated in FIG. 16A, the directivity conversion pattern 40 may not be provided at a corner, which the light hardly reaches from the point light source 32, on the side of the point light source 32. As illustrated in FIG. 16B, the region where the directivity conversion pattern 40 does not exist may be enlarged at the corner on the point light source side to form the pattern formation region 47 into a trapezoidal shape. As illustrated in FIG. 16C, in the pattern formation region 47, an edge on the opposite side to the point light source 32 may be swelled toward the opposite side to the point light source 32. As illustrated in FIG. 16D, in the pattern formation region 47, the edge on the opposite side to the point light source 32 may be recessed onto the point light source side.

Modification

FIG. 17 is a plan view of a surface illumination device 48 according to a modification of the first embodiment of the present invention. The pattern elements 40*a* of the directivity conversion pattern 40 may be parallel to one another on both the sides of the optical axis C of the point light source 32. That is, in the surface illumination device 48, the pattern elements 40*a* of the directivity conversion pattern 40 are inclined in the directions opposite to each other with respect to the optical axis C on both the sides of the optical axis C of the point light source 32. The pattern elements 40*a* are parallel to one another in a right half of the optical axis C, and the pattern elements 40*a* are also parallel to one another in a left half.

Even if the pattern elements 40*a* are parallel to one another, the directional pattern of the light reflected by the directivity conversion pattern 40 can be bent such that the angle formed by the light and the optical axis C increases. Therefore, the color unevenness between the central portion and both the side end portions of the light guide plate 33 can be improved. Additionally, the directivity conversion pattern 40 can easily produced when the pattern elements 40*a* are parallel to one another in each of the right and left regions. Particularly, a molding die is easily produced in the case that a reverse pattern is formed in the molding die by cutting in order to form the directivity conversion pattern 40.

Figure 18:
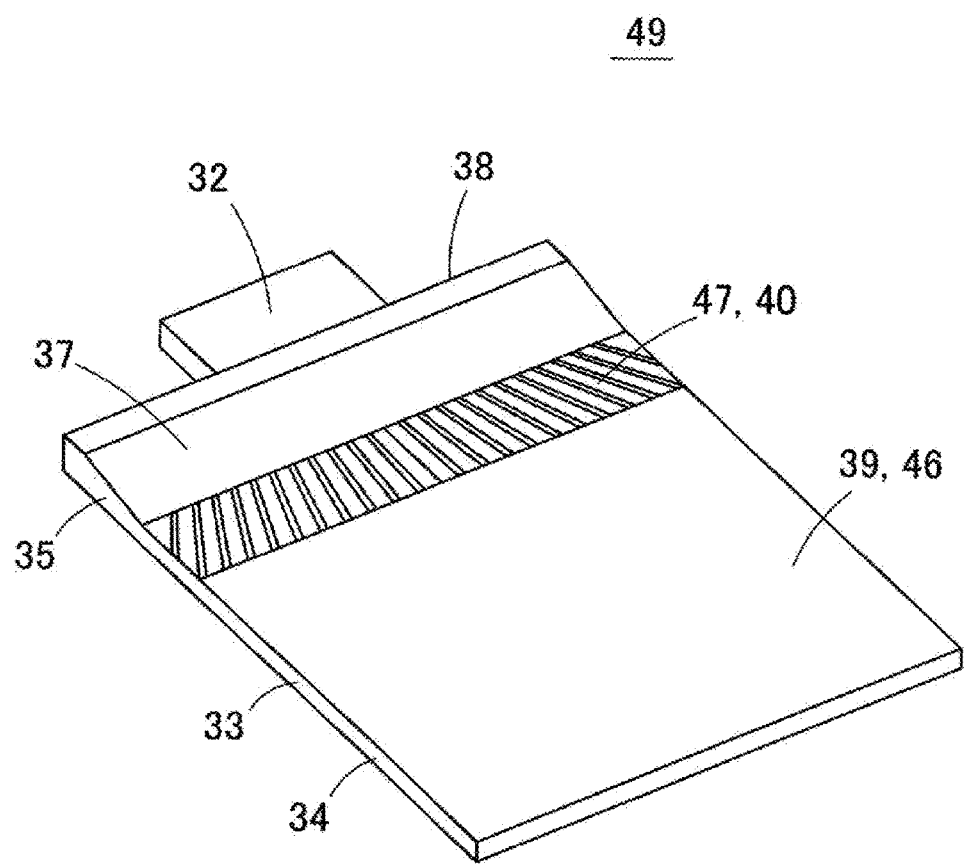
FIG. 18 is a perspective view of a surface illumination device according to another modification of the first embodiment of the present invention.

FIG. 18 is a perspective view of a surface illumination device 49 according to another modification of the first embodiment of the present invention. Like the surface illumination device 49, the lenticular lens 36 is eliminated in the light exit surface 39 of the effective illumination region 46, and the light exit surface 39 may be smooth (a mirror surface). Even if the lenticular lens 36 is eliminated, the color unevenness between the central portion and both the side end portions of the light guide plate 33 is usefully improved. A coarse surface may be used as the light exit surface 39.

Second Embodiment

Figure 19:
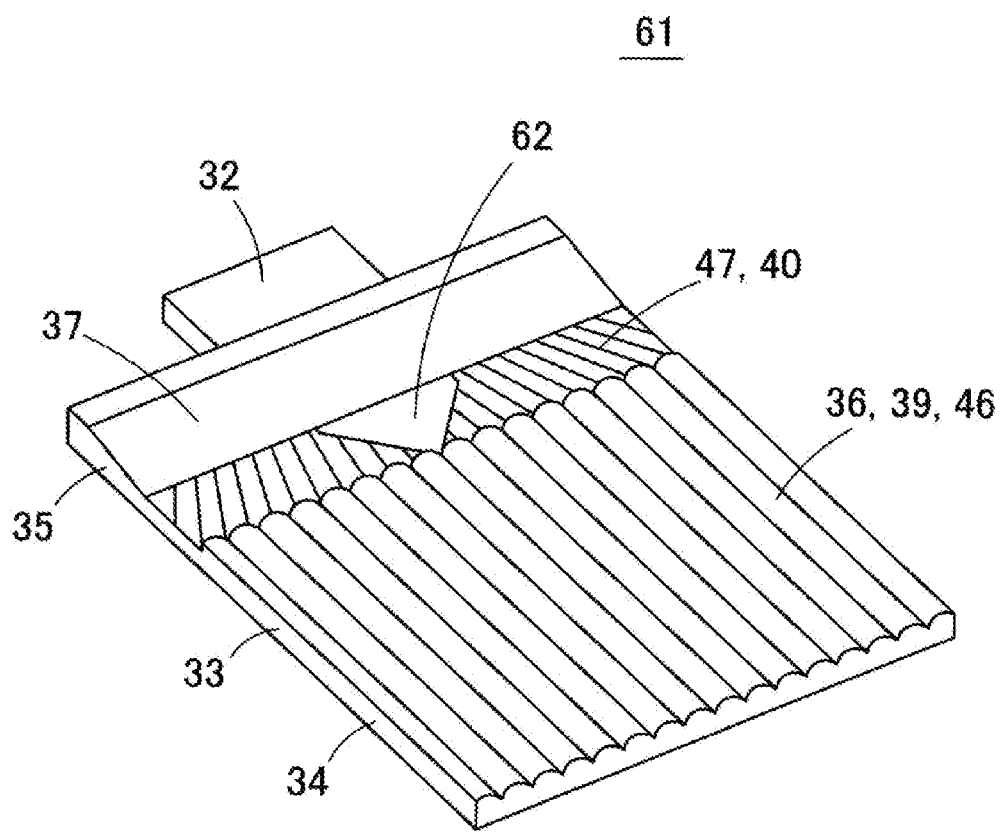
FIG. 19 is a perspective view of a surface illumination device according to a second embodiment of the present invention.
Figure 20:
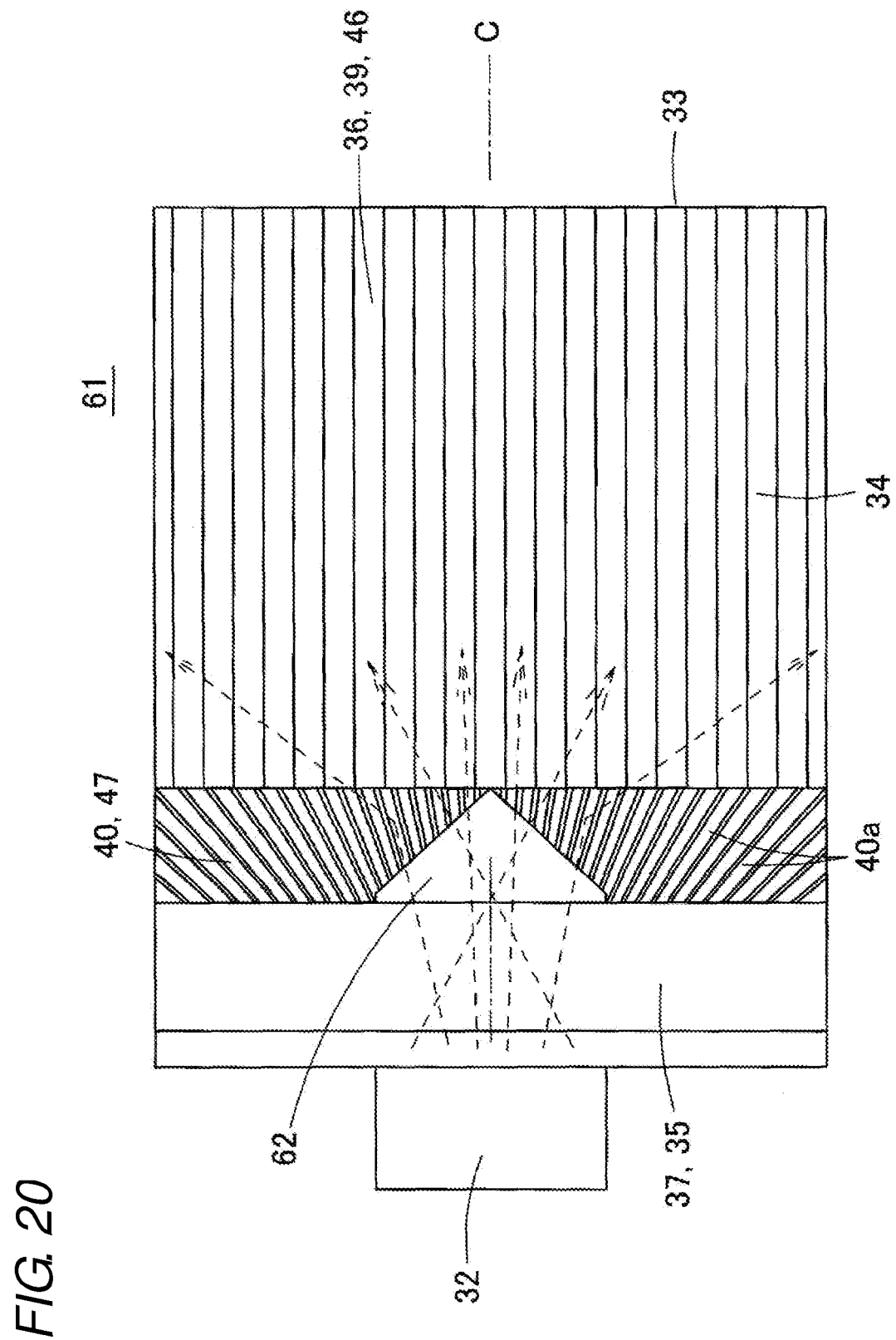
FIG. 20 is a plan view of the surface illumination device in FIG. 19.
Figure 21:
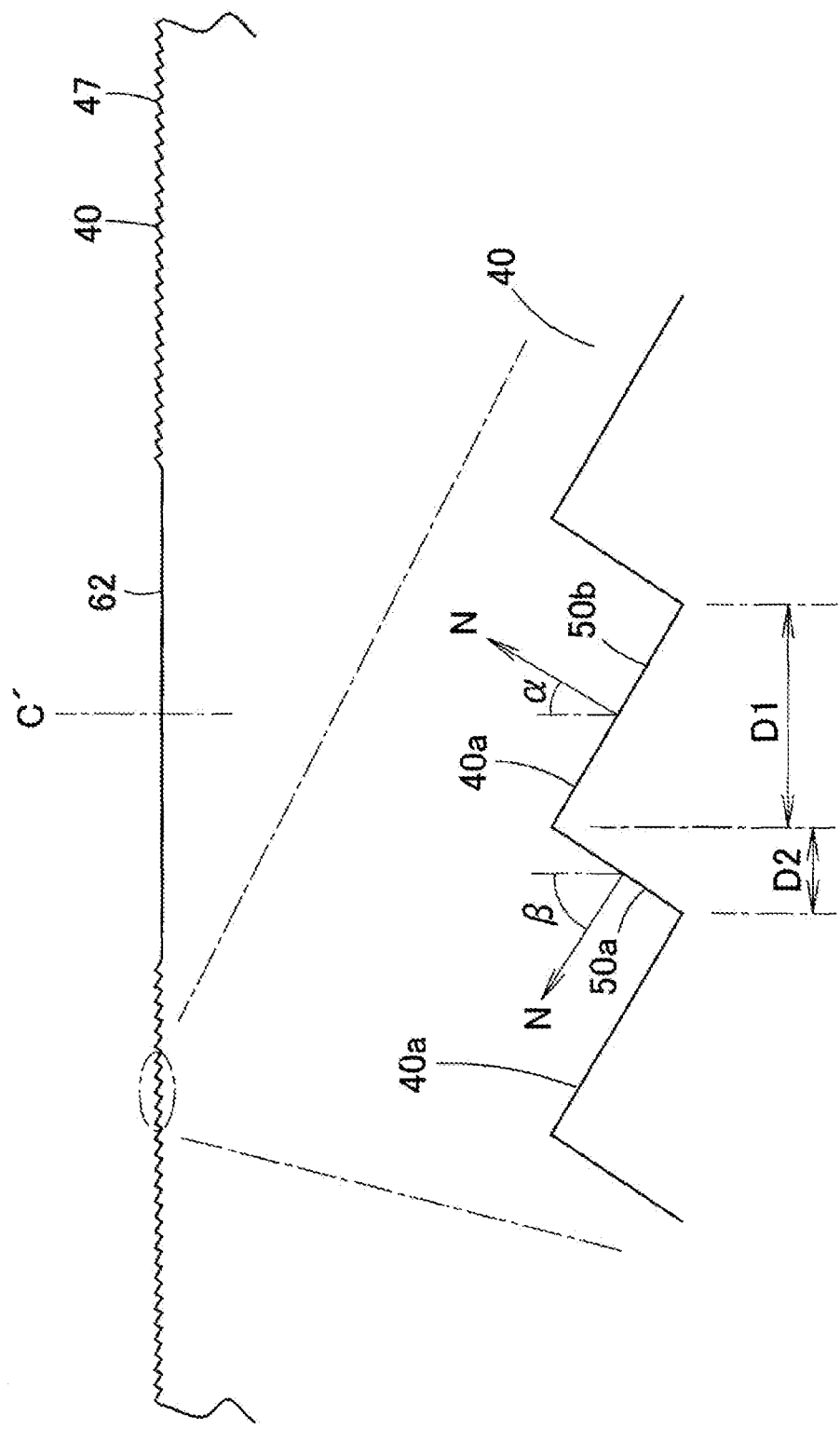
FIG. 21 is a sectional view illustrating the shape of the directivity conversion pattern in the section parallel to the light incident surface and an enlarged part of the directivity conversion pattern.

FIG. 19 is a perspective view of a surface illumination device 61 according to a second embodiment of the present invention. FIG. 20 is a plan view of the surface illumination device 61. FIG. 21 illustrates the cross sectional shape of the directivity conversion pattern 40 in the section parallel to the light incident surface 38. FIG. 21 is an enlarged view illustrating part of the directivity conversion pattern 40.

In the surface illumination device 61 of the second embodiment, the directivity conversion pattern 40 is partially removed near the optical axis C of the point light source 32, and a flat surface 62 (the mirror surface) is formed. Particularly, as illustrated in FIGS. 19 and 20, a triangular flat surface 62 is provided while sandwiched between the right and left directivity conversion patterns 40.

As illustrated in FIG. 21, in the right and left directivity conversion patterns 40, assuming that the normal N normal to the slope of each pattern element 40a toward the outside from the inside of the light guide plate 33 in the section parallel to the light incident surface 38, the summation of widths D1 of the inward-normal slopes 50a is greater than the summation of widths D2 of the inward-normal slopes 50b. The average angle of the angle β formed by the normal N of the outward-normal slope 50b and the perpendicular C' is greater than the average angle of the angle α formed by the normal N of the inward-normal slope 50a and the perpendicular C'.

According to the structure of the second embodiment, the light can be spread to the width direction of the light guide plate 33 by the directivity conversion patterns 40 on the right and left sides, and the color unevenness between the central portion and both the side end portions of the light guide plate 33 can be reduced. The directivity conversion pattern 40 is partially removed in front of the point light source 32, so that the amount of light delivered forward from the point light source 32 can be increased as indicated by a broken line in FIG. 20. As a result of the light laterally spread by the directivity conversion pattern 40, the light amount in front of the point light source 32 can be prevented from decreasing, and the front of the point light source 32 can be prevented from darkening.

Figure 22A:
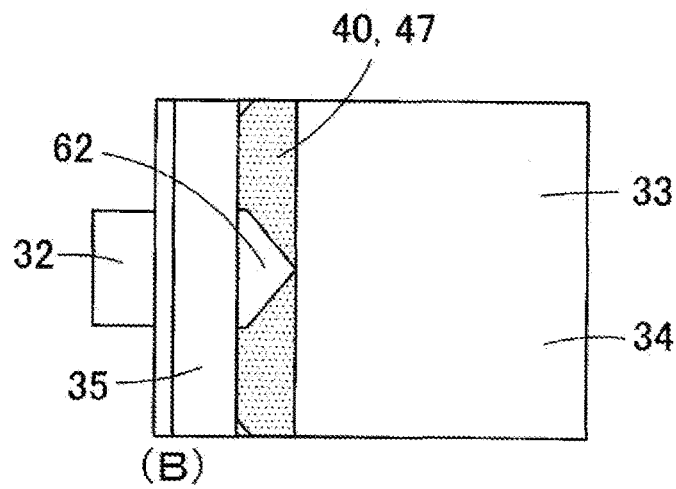
FIGS. 22A to 22C are views illustrating various shapes of pattern formation regions in each of which the directivity conversion pattern is formed.
Figure 22B:
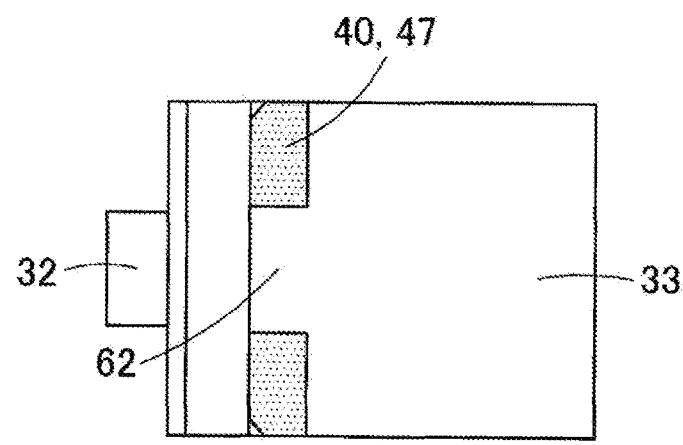
Figure 22C:
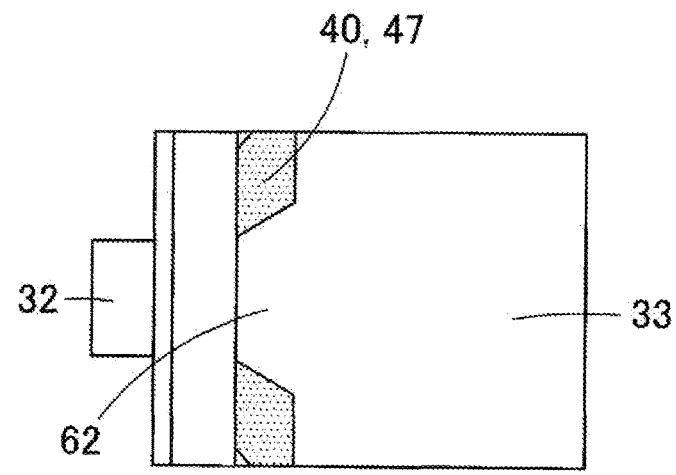

The shape of the portion (the flat surface 62) in which the directivity conversion pattern 40 is removed is not limited to the triangular shape in FIGS. 19 and 20. For example, the pentagonal directivity conversion pattern 40 may be removed as illustrated in FIG. 22A, the rectangular directivity conversion pattern 40 may be removed as illustrated in FIG. 22B, and the trapezoidal directivity conversion pattern 40 may be removed as illustrated in FIG. 22C.

Third Embodiment

Figure 23:
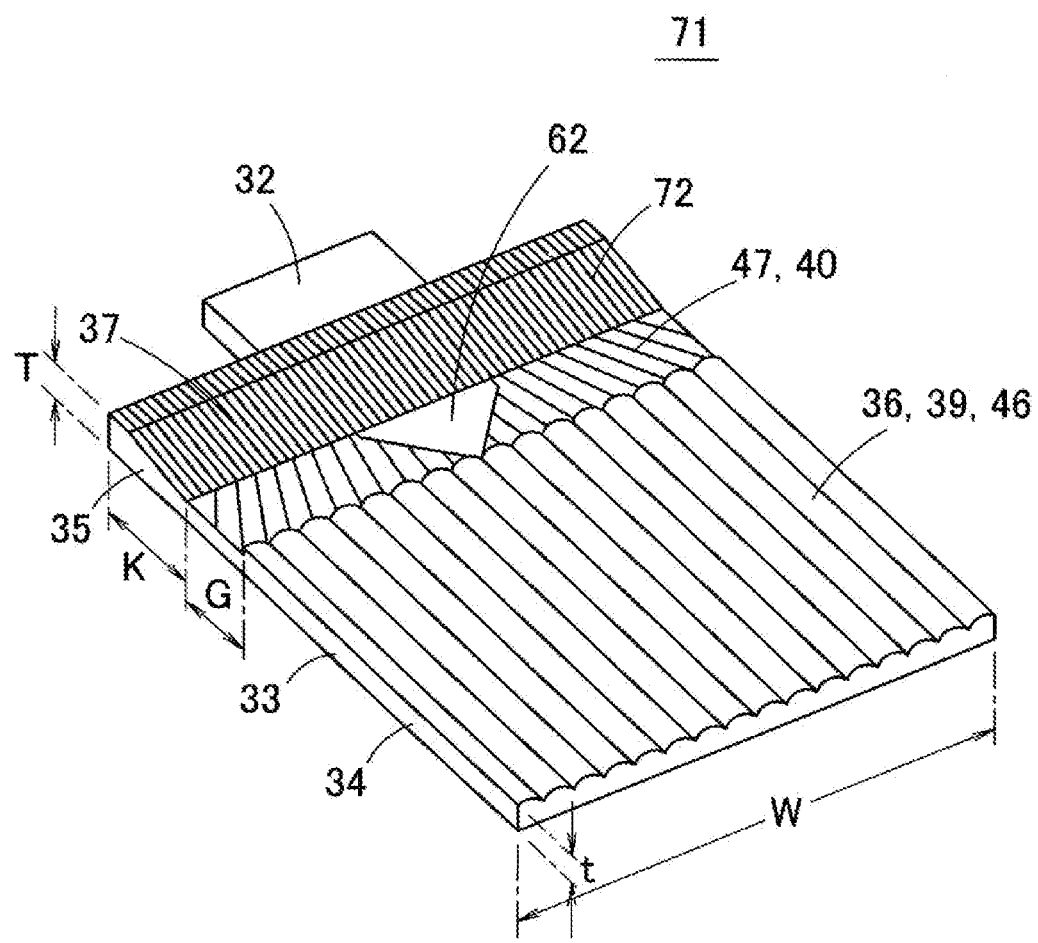
FIG. 23 is a perspective view of a surface illumination device according to a third embodiment of the present invention.
Figure 24:
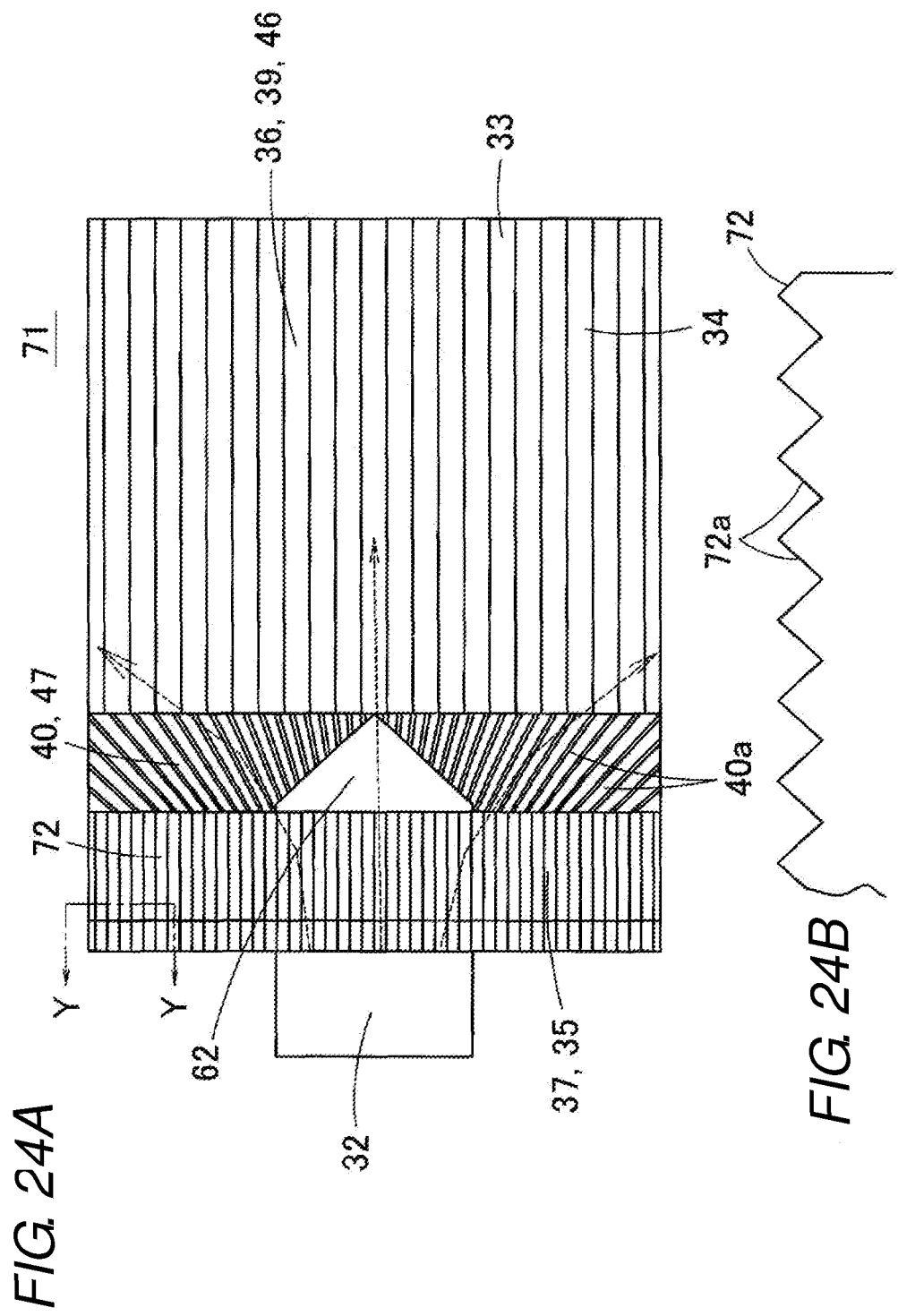
FIG. 24A is a plan view of the surface illumination device in FIG. 23.
FIG. 24B is a sectional view taken on a line Y-Y in FIG. 24A, and illustrates a cross sectional shape of a light diffusion pattern.

FIG. 23 is a perspective view of a surface illumination device 71 according to a third embodiment of the present invention. FIG. 24A is a plan view of the surface illumination device 71. FIG. 24B is a sectional view taken on a line Y-Y in FIG. 24A.

In the surface illumination device 71 of the third embodiment, a light diffusion pattern 72 is further formed in the upper surface and/or the lower surface of the light introduction unit 35 in order to laterally spread the directivity of the reflected light. In the light diffusion pattern 72, longitudinally extending V-grooves 72a may be arrayed in parallel with one another as illustrated in FIG. 24B, or a lenticular-lens-shaped pattern or a random pattern may be used. In the structure of the third embodiment, the light is laterally spread by the light diffusion pattern 72 and delivered to the side surface direction of the light guide plate 33, thereby preventing the side edge portion of the light exit surface 39 from darkening. Additionally, the flat surface 62 in which the directivity conversion pattern 40 is eliminated is formed in front of the point light source 32 to prevent the front of the point light source 32 from darkening.

When the light diffusion pattern 72 is constructed by V-grooves 72a, the light hardly leaks to the outside from the inclined surface 37 or the light introduction unit 35, and the light incident to the light introduction unit 35 from the point light source 32 can be guided to the light guide plate body 34 with a low loss.

The effect that reduces the color unevenness of the light guide plate 33 was able to be confirmed when a sample was produced while dimensions of the units in FIG. 23 are set as follows in the surface illumination device 71 of the third embodiment.

Width of light exit window of point light source 32: 2 mm
Width W of light guide plate 33: 5.5 mm
Maximum thickness T of light introduction unit 35: 0.42 mm
Length K of light introduction unit 35: 1.5 mm
Thickness t of light guide plate body 34: 0.23 mm
Length G of pattern formation region 47: 1.5 mm
Refractive index n of light guide plate 33: 1.59

Modification

Figure 25:
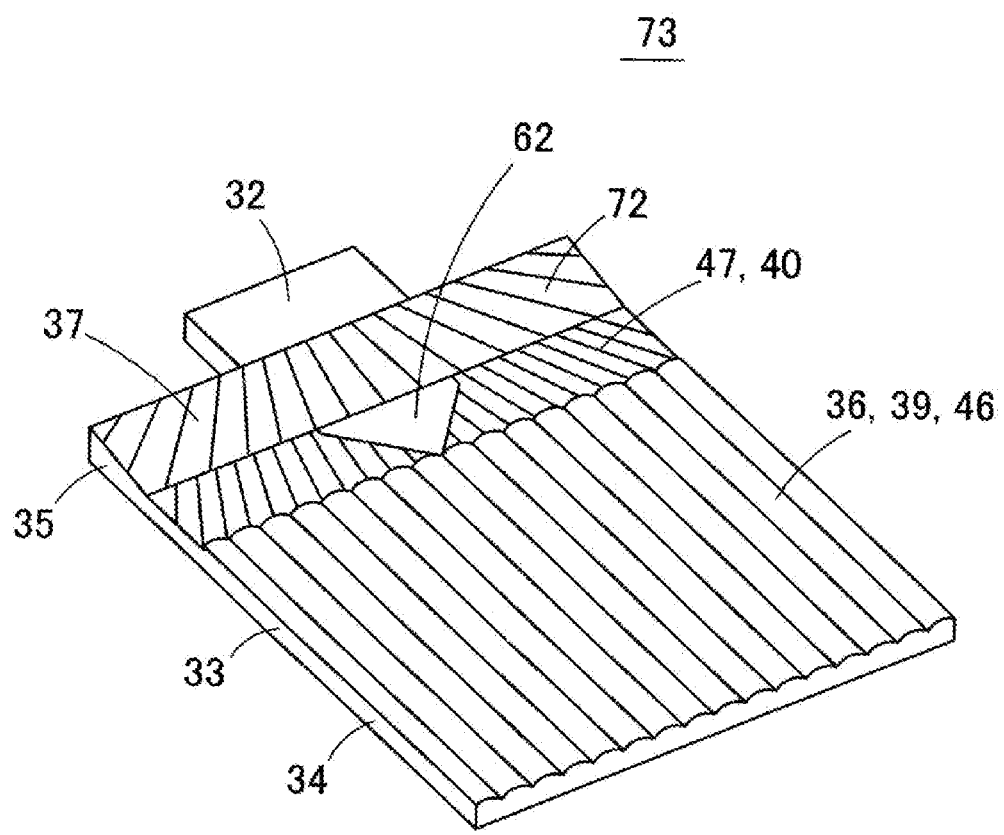
FIG. 25 is a perspective view of a surface illumination device according to a modification of the third embodiment of the present invention.

FIG. 25 is a perspective view of a surface illumination device 73 according to a modification of the third embodiment of the present invention. In the surface illumination device 73, the light diffusion pattern 72 is radially formed in order to laterally spread the light.

Fourth Embodiment

Figure 26:
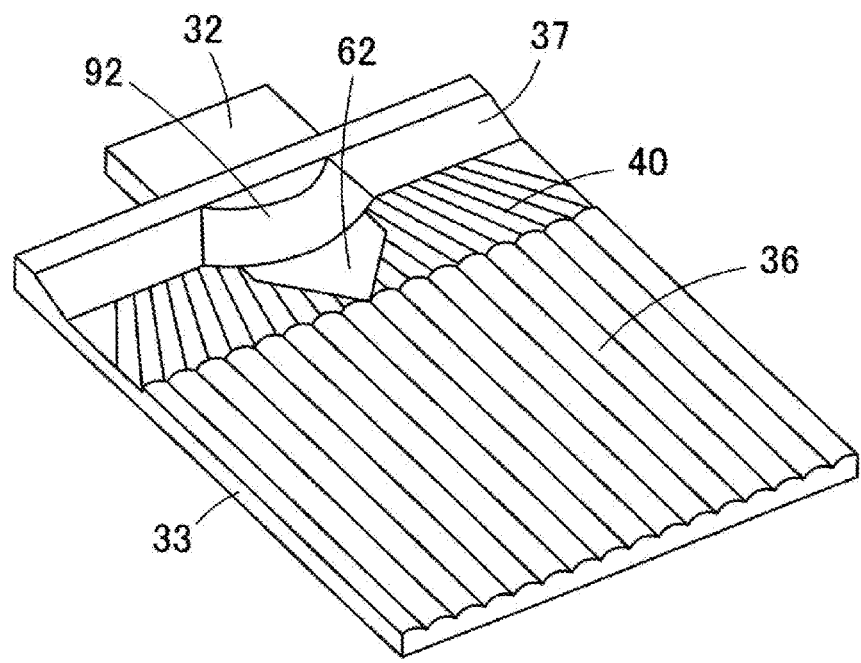
FIG. 26 is a perspective view of a surface illumination device according to a fourth embodiment of the present invention.

FIG. 26 is a perspective view of a surface illumination device 91 according to a fourth embodiment of the present invention. In the surface illumination device 91, in front of the point light source 32, a bulging unit 92 is formed in the inclined surface 37 of the light introduction unit 35. The bulging unit 92 has the shape identical to that of part of a truncated cone. In the case that the bulging unit 92 is provided in the inclined surface 37, an outer circumferential surface (the inclined surface) of the bulging unit 92 surrounds the point light source 32 into a substantial arc shape when viewed from above the light guide plate 33. Therefore, the light incident to the light introduction unit 35 from the point light source 32 through the light incident surface 38 is substantially perpendicularly incident to the outer circumferential surface of the bulging unit 92. As a result, the light hardly leaks from the inclined surface (the outer circumferential surface of the bulging unit 92) of the light introduction unit 35, and light guide efficiency to the light guide plate body 34 from the light introduction unit 35 is improved.

Modification

Figure 27:
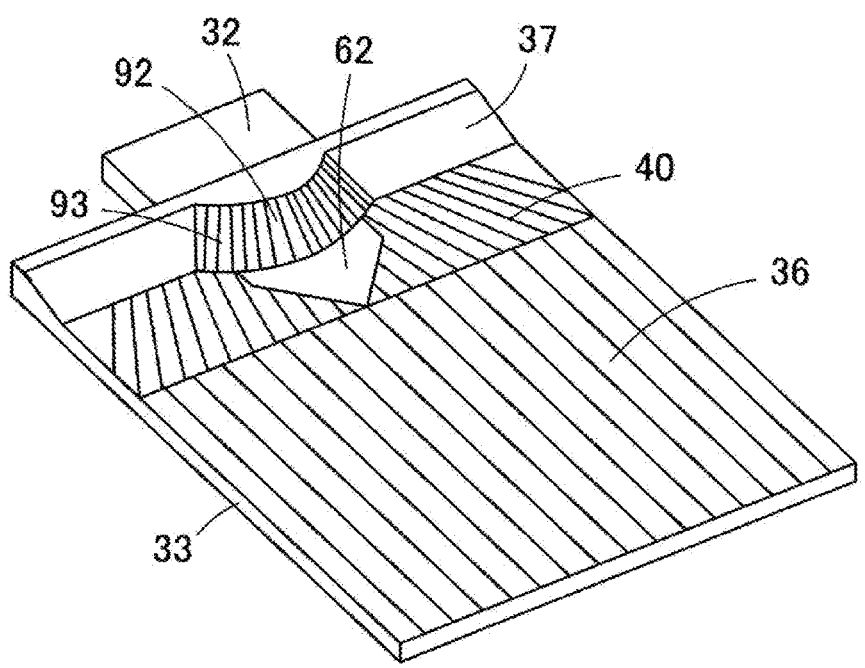
FIG. 27 is a perspective view of a surface illumination device according to a modification of the fourth embodiment of the present invention.

In the surface illumination device of the fourth embodiment, as illustrated in FIG. 27, a light diffusion pattern 93 may be provided in the outer circumferential surface of the bulging unit 92 in order to laterally spread the light.

(Various Forms of Light Guide Plate)

FIGS. 28A to 28C, FIGS. 29A to 29C, FIGS. 30A to 30C, and FIGS. 31A to 31C are schematic side views illustrating various shapes of the light guide plates 33. The effect of the present invention can also be exerted when the light guide plates in FIGS. 28 to 31 are used.

Figure 28A:
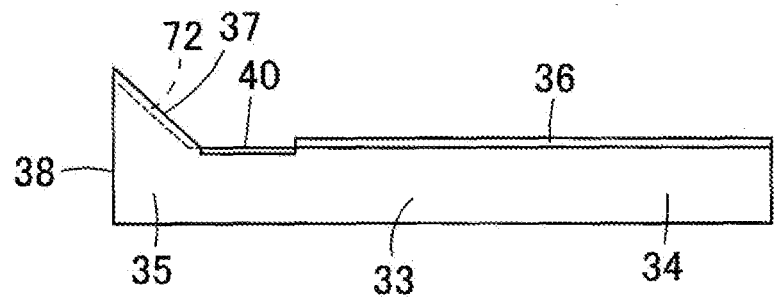
FIGS. 28A to 28C are schematic side views illustrating various forms of the light guide plates.
Figure 28B:
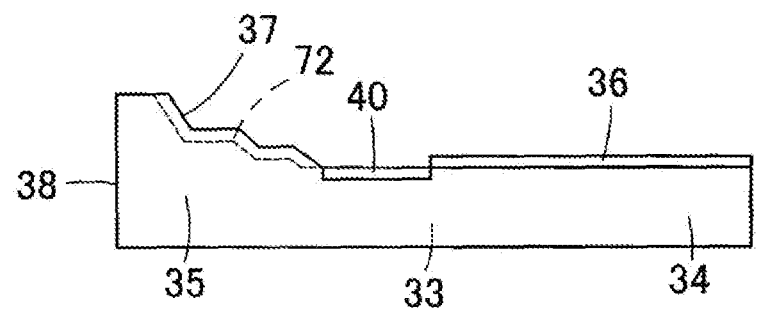
Figure 28C:
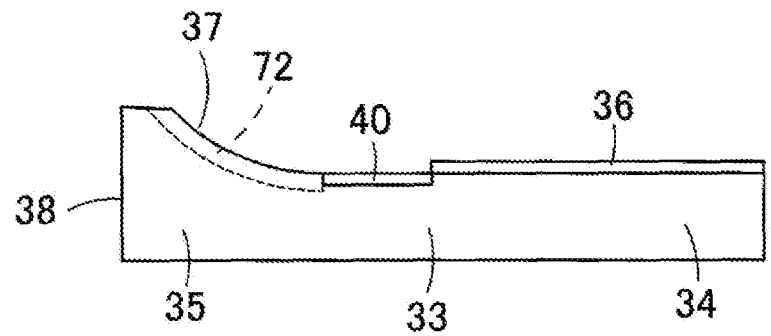

In the light guide plate 33 in FIG. 28A, the horizontal portion at the end of the light introduction unit 35 is eliminated, and the inclined surface 37 is started from the light incident surface 38. In the light guide plate 33 in FIG. 28B, the inclined surfaces 37 of the light introduction unit 35 are provided in a plurality of steps. In the light guide plate 33 in FIG. 28C, the inclined surface 37 of the light introduction unit 35 is formed by a curved surface.

Figure 29A:
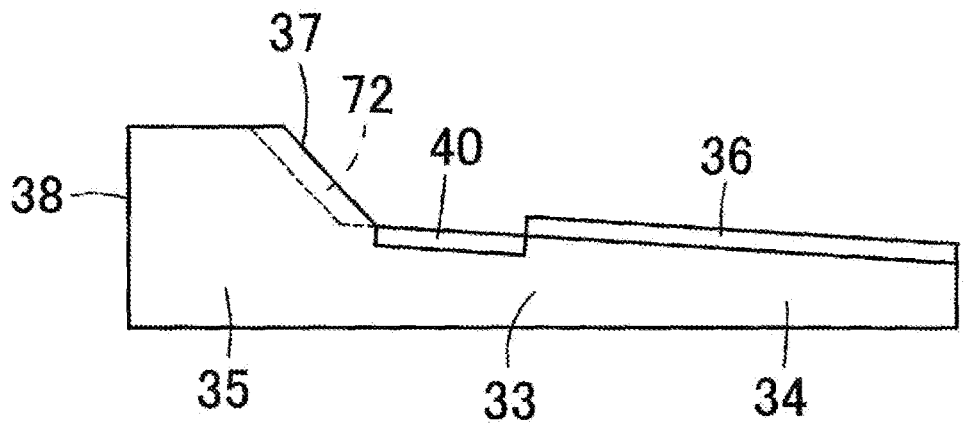
FIGS. 29A to 29C are schematic side views illustrating various forms of the light guide plates.
Figure 29B:
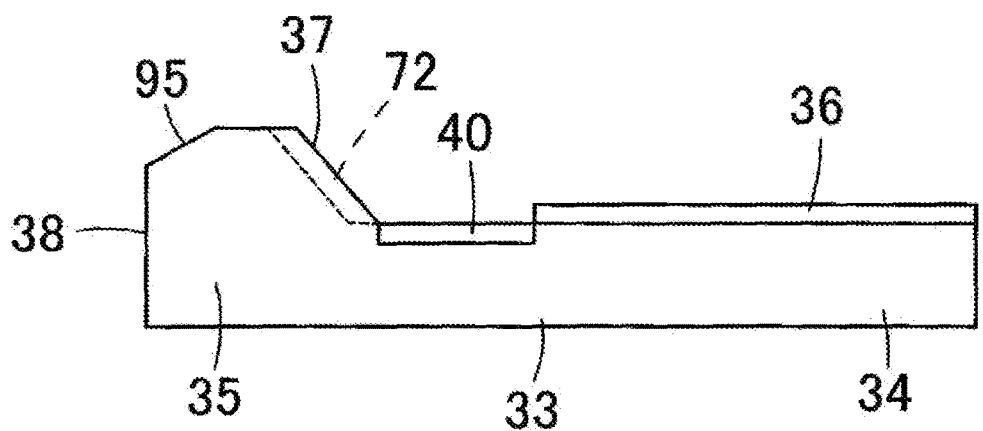
Figure 29C:
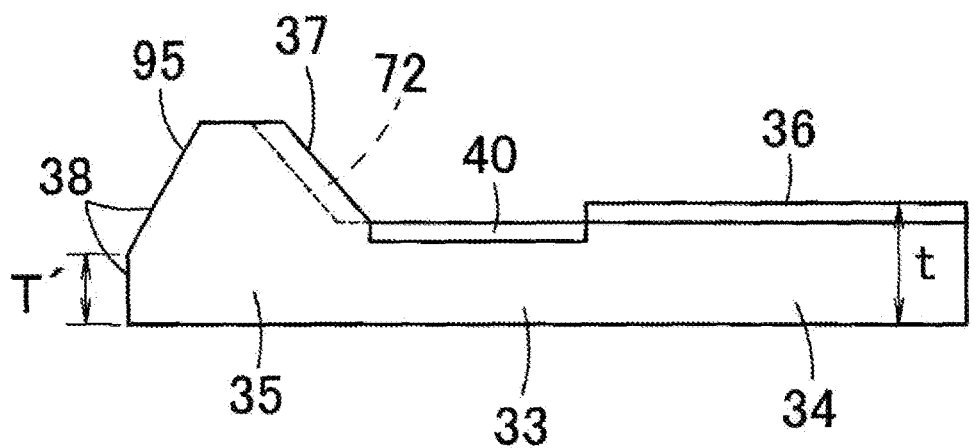

In the light guide plate 33 in FIG. 29A, the upper surface of the light guide plate body 34 is inclined and formed into a tapered shape. In the light guide plates 33 in FIGS. 29B and 29C, the upper surface of the light introduction unit 35 is inclined toward the opposite direction to the inclined surface 37 at the end on the side of the light incident surface 38 to provide a reversely inclined unit 95. Particularly, in the light guide plate 33 in FIG. 29C, a height T' at the end of the light introduction unit 35 is less than the thickness t of the light guide plate body 34 by providing the reversely inclined unit 95.

Figure 30A:
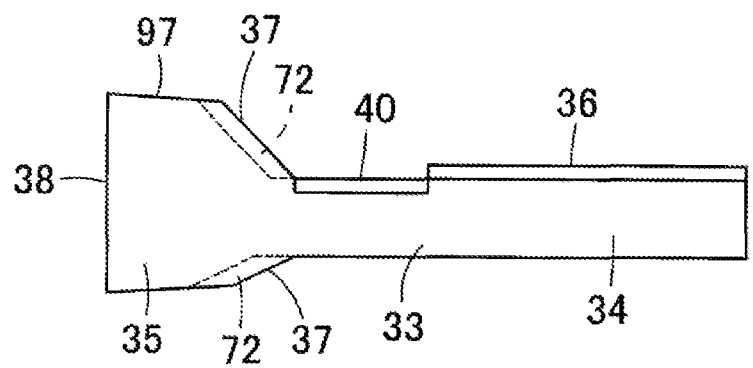
FIGS. 30A to 30C are schematic side views illustrating various forms of the light guide plates.
Figure 30B:
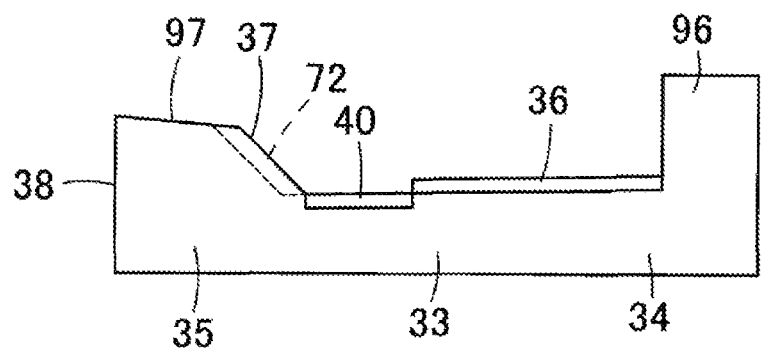

In the light guide plate 33 in FIG. 30A, the inclined surfaces 37 are provided in the upper and lower surfaces of the light introduction unit 35, and the light diffusion pattern 72 is provided in one of or both the inclined surfaces 37. As illustrated in FIG. 30B, a portion 96 that is greater than the thickness of the light introduction unit 35 may be provided in part of the light guide plate body 34.

As illustrated in FIGS. 30A and 30B, the uppermost surface of the light introduction unit 35 may gently be inclined to form a gently inclined surface 97.

Figure 30C:
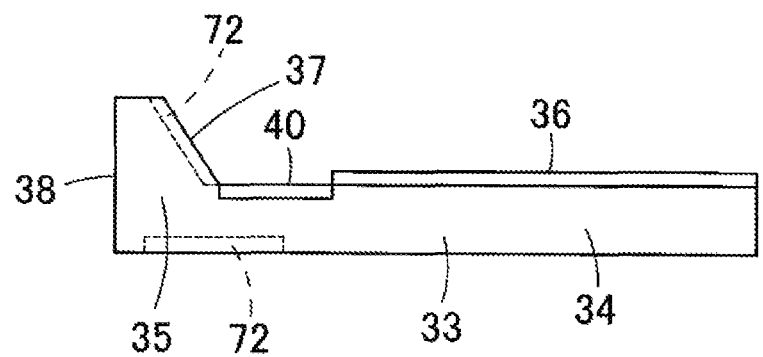
Figure 31A:
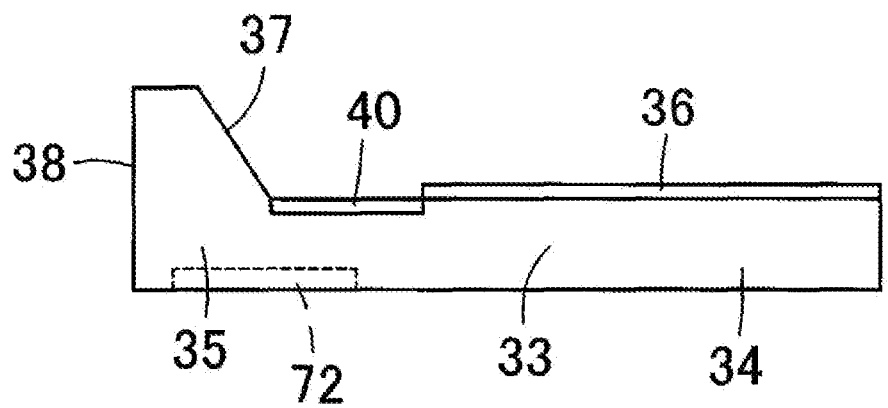
FIGS. 31A to 31C are schematic side views illustrating various forms of the light guide plates.

In the light guide plate 33 in FIG. 30C, the light diffusion patterns 72 are provided in both the inclined surface 37 and the lower surface of the light introduction unit 35. In the light guide plate 33 in FIG. 31A, the light diffusion pattern 72 is provided only in the lower surface of the light introduction unit 35. As illustrated in FIGS. 30C and 31A, the light diffusion pattern 72 provided in the lower surface of the light introduction unit 35 may project from the lower surface of the light guide plate body 34.

Figure 31B:
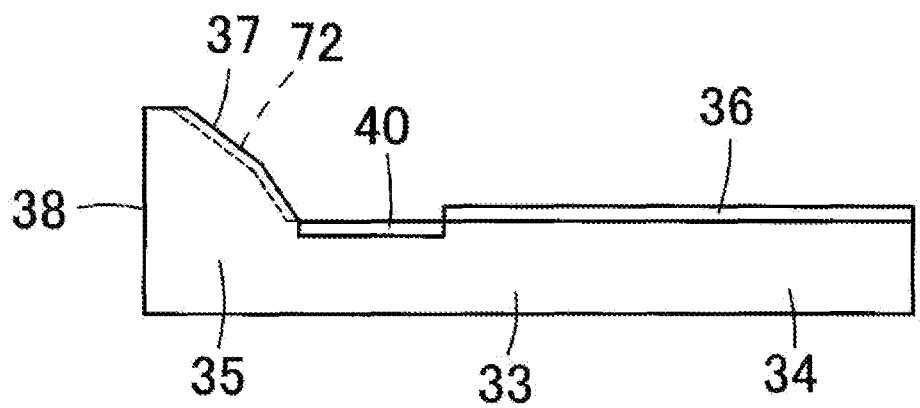
Figure 31C:
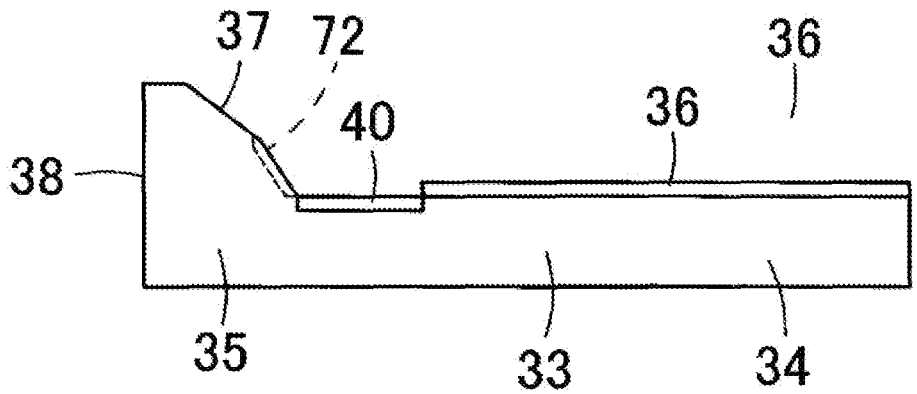

In the light guide plates 33 in FIGS. 31B and 31C, the inclined surface 37 is formed into two stages while the inclination of the inclined surface 37 changes in midstream. The light diffusion pattern 72 is provided in the whole of the inclined surface 37 in the light guide plate 33 in FIG. 31B, and the light diffusion pattern 72 is provided only in the lower half of the inclined surface 37 in the light guide plate 33 in FIG. 31C.

In the above embodiments and modifications, one light source is used. Alternatively, a plurality of point light sources may be arrayed while opposed to the light incident surface of the light guide plate. In this case, according to the position of each point light source, the directivity conversion pattern having the above configuration may repeatedly be provided at each interval equal to an array pitch of the point light sources.

In the above embodiments and modifications, the directivity conversion pattern is provided in the upper surface of the light guide plate. Alternatively, the directivity conversion pattern may be provided in the lower surface of the light guide plate or in both the upper and lower surfaces of the light guide plate.

Fifth Embodiment

Figure 32:
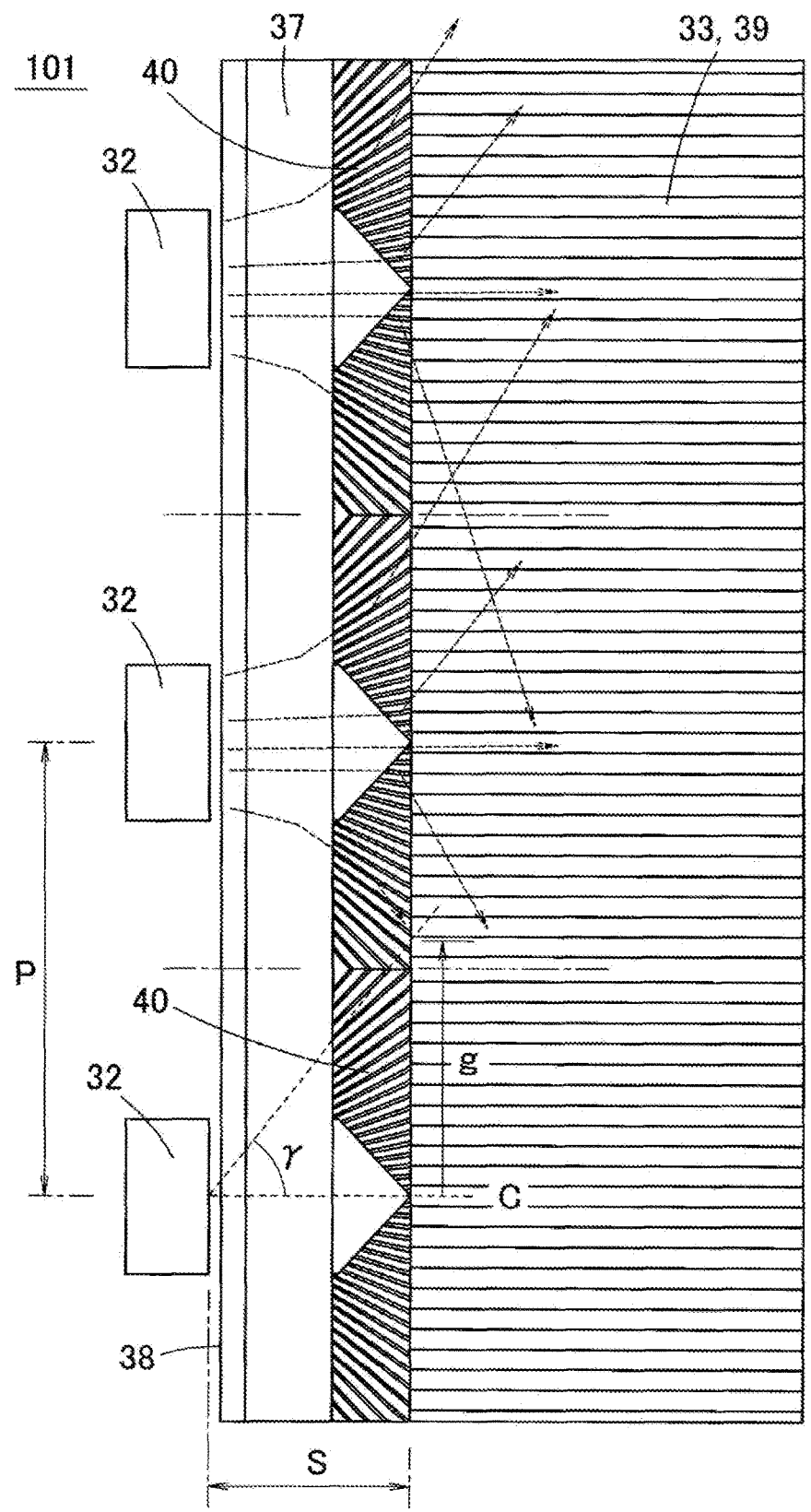
FIG. 32 is a plan view of a surface illumination device according to a fifth embodiment of the present invention.

A surface illumination device 101 including the plurality of point light sources 32 will be described below. FIG. 32 is a plan view illustrating the surface illumination device 101 in which the plurality of point light sources 32 are disposed while opposed to the light incident surface 38 of the light guide plate 33. In the surface illumination device 101, the identical directivity conversion patterns 40 are formed at intervals identical to a pitch P of the point light sources 32 with the midpoints between the point light sources 32 as boundaries. For example, the point light sources 32 have the pitch P of 5.5 mm, and the directivity conversion patterns 40 have the same interval of 5.5 mm.

In the case that the plurality of point light sources 32 are arrayed like the fifth embodiment, the light of the point light source 32 is spread by the directivity conversion pattern 40 as illustrated in FIG. 32. As a result, the light is also guided from the adjacent point light source 32 in a light guide plate region corresponding to a certain point light source 32, and the light mixing effect is further improved. Therefore, the color unevenness is reduced in front of each point light source 32 and in the middle portion of each point light source 32.

In the case that the plurality of point light sources 32 are arrayed, sometimes the light reaches the middle portion of the point light sources 32 adjacent to each other from the point light sources 32 on both the sides in the directivity conversion pattern 40. When the pieces of light are incident to a certain place of the directivity conversion pattern 40 from the point light sources 32 on both the sides, optimum design cannot be made such that the leakage is hardly generated for both the pieces of light, but the light use efficiency of the surface illumination device is degraded.

The pieces of light may not be incident to the directivity conversion pattern 40 from the plurality of point light sources 32. An incident angle γ of the light incident to the light introduction unit 35 from the point light source 32 through the light incident surface 38 is expressed by a Fresnel law using $$\gamma = \arcsin(1/n).$$  (mathematical formula 2)

Herein, n is the refractive index of the light guide plate 33. Therefore, the spread of the light in the light introduction unit 35 ranges horizontally within 2γ around the light source center C as illustrated in FIG. 32. From FIG. 32 and the mathematical formula 2, horizontal spread g of the light in the directivity conversion pattern 40 is expressed by $$g = S \tan \gamma S \cdot \gamma = S \cdot \arcsin(1/n).$$  (mathematical formula 3)

In order that the light guided to the direction of γ from the light source center C does not enter the adjacent region, the horizontal spread g is less than ½ of the pitch P of the point light source 32. Therefore, $$g \leq P/2$$  (condition 1)

is obtained, where S is a distance to the end of the directivity conversion pattern 40 from the end face (the emission surface) of the point light source 32. Therefore, from the mathematical formula 3 and the condition 1, $$S \leq P/[2 \cdot \arcsin(1/n)] \quad \text{(condition 2)}$$

is obtained as the condition that the pieces of light do not reach the directivity conversion pattern 40 from the two directions.

Accordingly, in the case that the plurality of point light sources 32 are used, when the distance S from the end face of the point light source 32 to the end of the directivity conversion pattern 40 is determined so as to satisfy the condition of $$S \leq P/[2 \cdot \arcsin(1/n)],$$

the directivity conversion pattern 40 can optimally be designed, the light leakage can be reduced to enhance the light use efficiency. For example, when the pitch P of the point light source 32 is set to 5.5 mm, and when the refractive index n of the light guide plate 33 is set to 1.59 (polycarbonate resin), $$J \leq \text{about 4 mm}$$

is obtained, and the length of about 4 mm or less is also obtained for the region where the directivity conversion pattern 40 is provided.

Sixth Embodiment

Figure 33A:
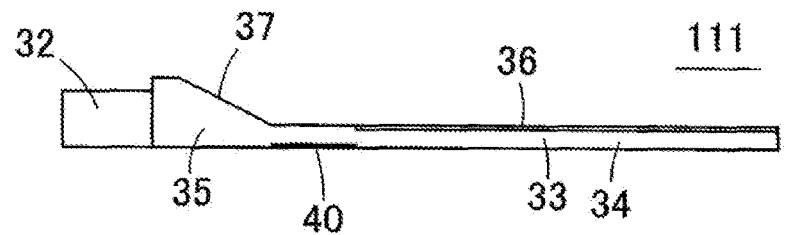
FIGS. 33A to 33C are a side view, a plan view, and a bottom view of a surface illumination device according to a sixth embodiment of the present invention.
Figure 33B:
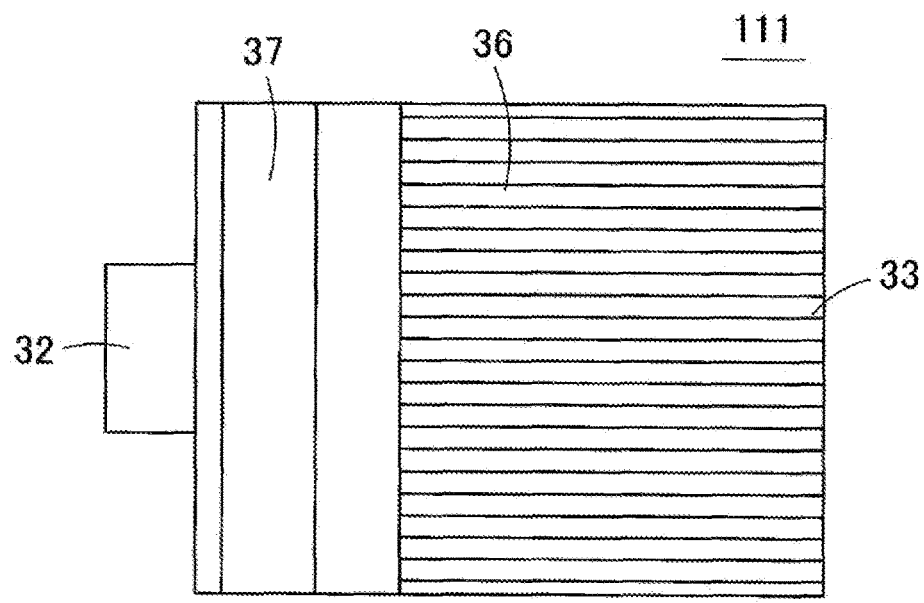
Figure 33C:
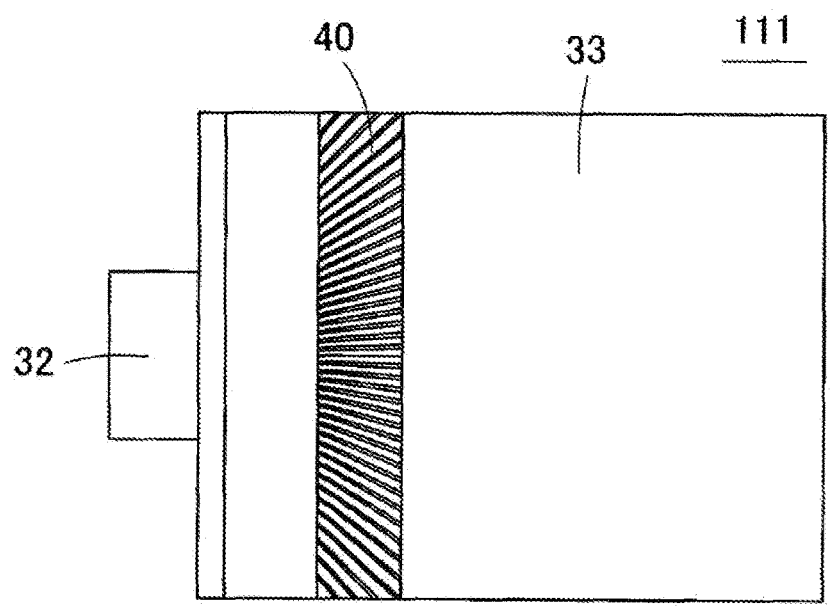

FIGS. 33A to 33C are a side view, a plan view, and a bottom view of a surface illumination device 111 according to a sixth embodiment of the present invention. In the surface illumination device 111, the lenticular lens 36 is provided in the effective illumination region on the upper surface of the light guide plate body 34, the end portion of the light guide plate body 34 in the lower surface of the light guide plate body 34 constitutes the pattern formation region 47, and the directivity conversion pattern 40 is provided in the pattern formation region 47.

In the embodiments in FIGS. 3 to 32, like the sixth embodiment, the directivity conversion pattern 40 may be provided in the surface on the opposite side to the light exit surface 39 of the light guide plate 33.

Seventh Embodiment

Figure 34:
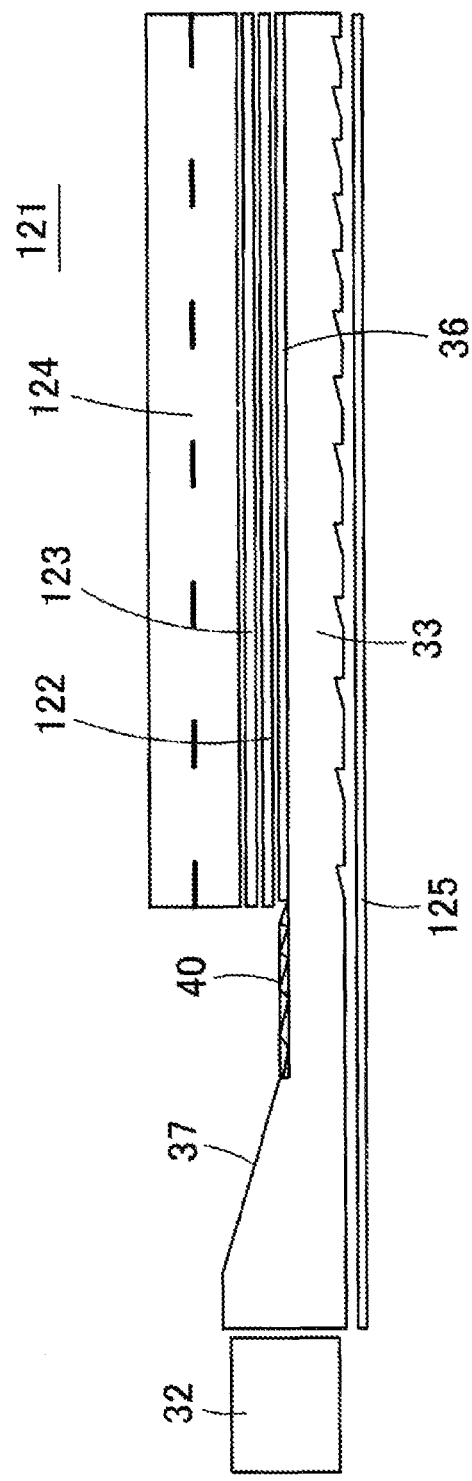
FIG. 34 is a sectional view of a liquid crystal display device according to a seventh embodiment of the present invention.

FIG. 34 is a schematic sectional view of a liquid crystal display device 121 in which the surface illumination device (for example, the surface illumination device 31 of the first embodiment) of the present invention is used. In the liquid crystal display device 121, a diffuser plate 122, a prism sheet 123, and a liquid crystal panel 124 are laminated while opposed to the light exit surface side of the light guide plate 33, and a reflecting sheet 125 is disposed on the rear surface side of the light guide plate 33. According to the liquid crystal display device 121, the feature of the surface illumination device of the present invention can be exerted, the generation of the color unevenness can be prevented on a screen of the liquid crystal display device 121, and image quality of the liquid crystal display device can be improved.

Eighth Embodiment

Figure 35:
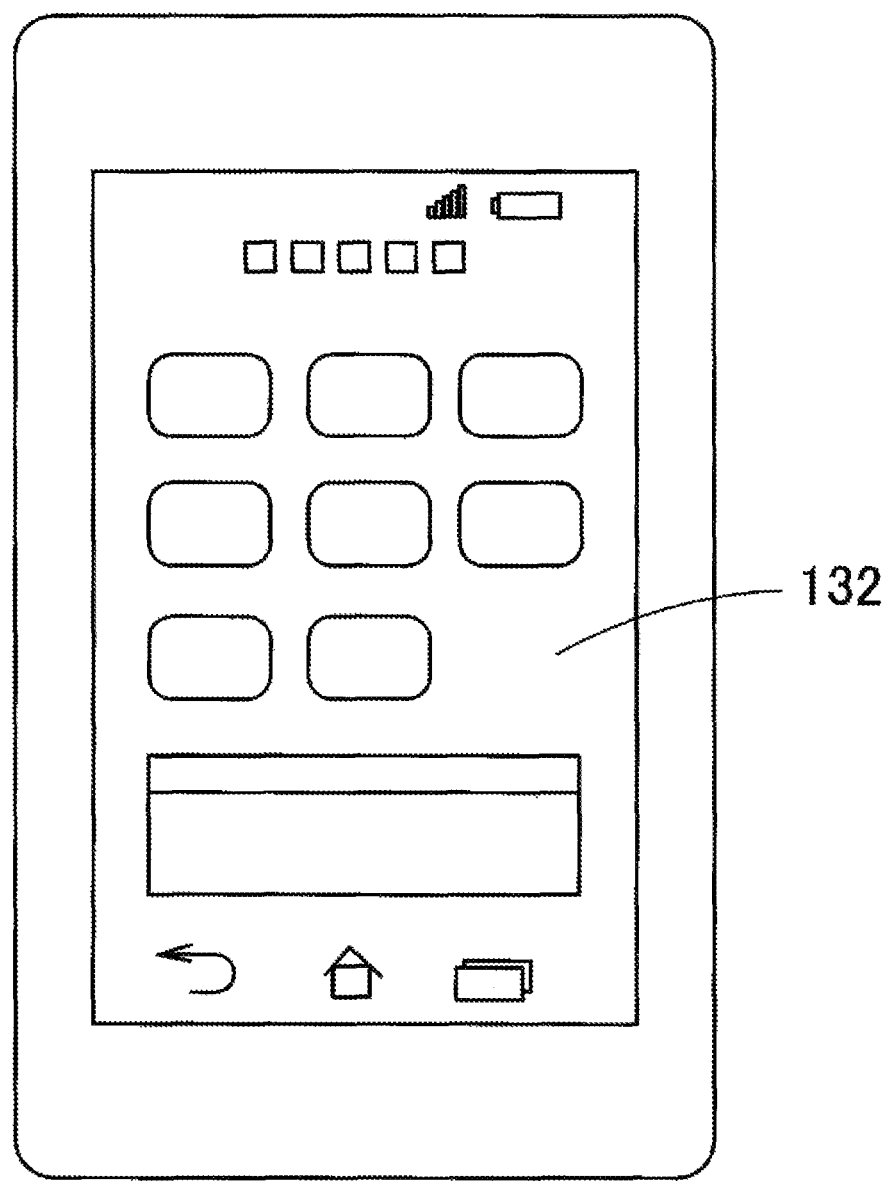
FIG. 35 is a front view illustrating a mobile device according to an eighth embodiment of the present invention.

FIG. 35 is a plan view of a mobile device in which the surface illumination device or the liquid crystal display device of the present invention is used, namely, a smartphone 131. A liquid crystal display device 132 equipped with a touch panel is incorporated in the front surface of the smartphone 131. When the surface illumination device of the present invention is used in the smartphone 131, the color unevenness of the screen is reduced, so that quality of the display screen can be improved. In addition to mobile phones such as the smartphone, the surface illumination device of the present invention can be applied to mobile devices such as a tablet computer, an electronic dictionary, and an electronic book reader.

According to the light guide plate of the embodiments of the present invention, the light passing through the light introduction unit can be spread to the width direction of the light guide plate by the directivity conversion pattern. Therefore, even if the coloring exists in the light emitted from the light source in the exit direction, the color unevenness can be reduced by mixing the pieces of light having different colors. Particularly, the color unevenness of the light can be reduced in front of the light source and in both the side end portions of the light guide plate.

In the light guide plate, the directivity conversion pattern may include a plurality of pattern elements, and at least some of the pattern elements have asymmetric shapes in a cross section of the directivity conversion pattern parallel to the light incident surface. In the light guide plate, the directivity conversion pattern may include a plurality of pattern elements having V-groove shapes. In the light guide plate, a lenticular lens shape may be formed in the light exit surface.

In the light guide plate, the directivity conversion pattern may be configured such that slopes having different inclination directions are alternately arranged along a width direction of the light incident surface, and in the cross section of the directivity conversion pattern parallel to the light incident surface, assuming normals to slopes of the directivity conversion patterns are drawn toward the outside from an inside in each of regions on both sides between which a virtual straight line perpendicular to the light incident surface is sandwiched, a cross sectional shape of the directivity conversion pattern is such that a summation of widths of the slopes in each of which the normal is inclined on a virtual straight line side is greater than a summation of width of the slopes in each of which the normal is inclined on an opposite side to the virtual straight line, and the virtual straight line passes through an emission center of the light incident to the incident surface. Accordingly, the light reflected by the directivity conversion pattern can further be spread to the width direction of the light guide plate to enhance an effect that mixes the pieces of light having the different colors of the light source.

In the light guide plate, the directivity conversion pattern may be configured such that slopes having different inclination directions are alternately arranged along a width direction of the light incident surface, and in the cross section parallel of the directivity conversion pattern to the light incident surface, assuming normals to slopes of the directivity conversion patterns are drawn toward the outside from an inside in each of regions on both sides between which a virtual straight line perpendicular to the light incident surface is sandwiched, a cross sectional shape of the directivity conversion pattern is such that an average angle of an angle formed by the normal belonging to the slope in which the normal is inclined on an opposite side to the virtual straight line and the direction perpendicular to the light exit surface is greater than an average angle of an angle formed by the normal belonging to the slope in which the normal is inclined on a virtual straight line side and the direction perpendicular to the light exit surface, and the virtual straight line passes through an emission center of the light incident to the light incident surface. Accordingly, the light reflected by the directivity conversion pattern can further be spread to the width direction of the light guide plate to enhance an effect that mixes the pieces of light having the different colors of the light source.

In the light guide plate, the directivity conversion pattern may include a plurality of pattern elements, and when viewed from the direction perpendicular to the light exit surface, a distance measured from a virtual straight line perpendicular to the light incident surface to an end of at least one of the pattern elements on the effective illumination region side is larger than a distance from the virtual straight line to an end of the at least one of the pattern elements on the light introduction unit side, and the virtual straight line passes through an emission center of the light incident to the light incident surface. In the light guide plate, an angle formed by the pattern element and the virtual straight line may increase with distance from the virtual straight line to the pattern element on both sides of the virtual straight line when viewed from the direction perpendicular to the light exit surface. In the light guide plate, the pattern elements may be arranged so as to be parallel to each other on both sides of the virtual straight line when viewed from the direction perpendicular to the light exit surface.

In the light guide plate, the directivity conversion pattern may include a plurality of pattern elements, and when viewed from the direction perpendicular to the light exit surface, an average value of angles each of which is formed by an extending direction of the pattern element and a virtual straight line perpendicular to the light incident surface on both sides between which the virtual straight line is sandwiched is less than or equal to 55°, and the virtual straight line passes through an emission center of the light incident to the light incident surface. When the average value of the angle formed by the extending direction of the pattern element and the virtual straight line is less than or equal to 55°, the color unevenness between the front of the light source and both the side end portions of the light guide plate can be reduced, and good luminance efficiency is maintained.

In the light guide plate, a vertex angle between the pattern elements adjacent to each other may range from 50° to 150°. Accordingly, the effect that reduces the color unevenness between the front of the light source and both the side end portions of the light guide plate can be enhanced, and the good luminance efficiency is maintained.

In the light guide plate, a light diffusion pattern may be provided in the light introduction unit in order to spread the light incident from the incident surface into a width direction of the light introduction unit. There is no particular limitation to the position in which the light diffusion pattern is provided. For example, the light diffusion pattern may be provided in an upper or a lower surface of the light introduction unit or an upper or a lower surface that is of the inclined surface. Accordingly, the light incident to the light introduction unit from the light incident surface can laterally be spread by the light diffusion pattern. Therefore, the effect that mixes the pieces of light emitted from the light source can be enhanced, and the color unevenness between the front of the light source and both the side end portions of the light guide plate can further be reduced.

Further disclosed is a surface illumination device, the surface illumination device comprising: the light guide plate of the embodiments of the present invention; and a light source disposed in a position opposed to the light incident surface of the light guide plate. Accordingly, even if the coloring exists in the light emitted from the light source in the exit direction, the color unevenness can be reduced by mixing the pieces of light having different colors. Particularly, the color unevenness of the light can be reduced in front of the light source and in both the side end portions of the light guide plate.

In the surface illumination device, a plurality of light sources are disposed at intervals P in the position opposed to the light incident surface, and the directivity conversion pattern exists within a region located less than or equal to a distance of $$P/[2 \cdot \arcsin(1/n)]$$

from an end face on a light exit side of the light source, where n is a refractive index of the light guide plate. When the region where the directivity conversion pattern is formed extends beyond $P/[2 \cdot \arcsin(1/n)]$ from the end face on the light exit side of the light source, the light emitted from a certain light source enters the region in front of the adjacent light source to degrade the light use efficiency.

Further disclosed is a liquid crystal display device, the liquid crystal display device comprising: the surface illumination device of the embodiments of the present invention; and a liquid crystal panel. The surface illumination device is used in the liquid crystal display device, so that the color unevenness of a screen of the liquid crystal display device can be reduced.

Further disclosed is a mobile device, the mobile device comprising the liquid crystal display device of the embodiments of the present invention. The mobile device includes the surface illumination device of the embodiments of the present invention, so that the color unevenness of the screen of the liquid crystal display device can be reduced.

The means for solving the problem in the present invention has the feature in which the constituents are properly combined, and many changes can be made by the combination of the constituents in the present invention.

The invention claimed is:

1. A light guide plate for introducing light from a light incident surface to output the light to an outside from a light exit surface, the light guide plate comprising:
   a light introduction unit configured to confine the light incident from the light incident surface; and
   a light guide plate body having a thickness smaller than a maximum thickness of the light introduction unit, the light guide plate body being provided so as to be continuously connected to the light introduction unit, the confined light being output to the outside from the light exit surface by a light exit part,
   wherein
   the light introduction unit includes an inclined surface in at least one of a surface on a light exit side of the light guide plate and an opposite surface thereof, the inclined surface being inclined toward an end of a surface of the light guide plate body from a surface in a portion having a thickness greater than that of the light guide plate body,
   the light guide plate body includes a directivity conversion pattern in a region located between the light introduction unit and an effective illumination region of the light guide plate body in at least one of the surface on the light exit side of the light guide plate and the opposite surface thereof, and
   the directivity conversion pattern converts a directivity direction of the light passing through the effective illumination region from the light introduction unit such that an angle formed by the directivity direction of the light and a direction perpendicular to the light incident surface increases when viewed from a direction perpendicular to the light exit surface, wherein the directivity conversion pattern includes a plurality of pattern elements, and at least some of the pattern elements have asymmetric shapes in a cross section of the directivity conversion pattern parallel to the light incident surface, wherein the directivity conversion pattern is configured such that slopes having different inclination directions are alternately arranged along a width direction of the light incident surface, and in the cross section of the directivity conversion pattern parallel to the light incident surface assuming normals to slopes of the directivity conversion patterns are drawn toward the outside from an inside in each of regions on both sides between which a virtual straight line perpendicular to the light incident surface is sandwiched, a cross sectional shape of the directivity conversion pattern is such that a summation of widths of the slopes in each of which the normal is inclined on a virtual straight line side is greater than a summation of width of the slopes in each of which the normal is inclined on an opposite side to the virtual straight line, and the virtual straight line passes through an emission center of the light incident to the light incident surface.

2. The light guide plate according to claim 1, wherein the cross sectional shape of the directivity conversion pattern is such that an average angle of an angle formed by the normal belonging to the slope in which the normal is inclined on an opposite side to the virtual straight line and the direction perpendicular to the light exit surface is greater than an average angle of an angle formed by the normal belonging to the slope in which the normal is inclined on a virtual straight line side and the direction perpendicular to the light exit surface.

3. The light guide plate according to claim 1, wherein when viewed from the direction perpendicular to the light exit surface, a distance measured from a virtual straight line perpendicular to the light incident surface to an end of at least one of the pattern elements on the effective illumination region side is larger than a distance from the virtual straight line to an end of the at least one of the pattern elements on the light introduction unit side, and the virtual straight line passes through an emission center of the light incident to the light incident surface.

4. The light guide plate according to claim 3, wherein an angle formed by the pattern element and the virtual straight line increases with distance from the virtual straight line to the pattern element on both sides of the virtual straight line when viewed from the direction perpendicular to the light exit surface.

5. The light guide plate according to claim 1, wherein when viewed from the direction perpendicular to the light exit surface, an average value of angles each of which is formed by an extending direction of the pattern element and a virtual straight line perpendicular to the light incident surface on both sides between which the virtual straight line is sandwiched is less than or equal to 55.degree., and the virtual straight line passes through an emission center of the light incident to the light incident surface.

6. The light guide plate according to claim 1, wherein the directivity conversion pattern includes the plurality of pattern elements having V-groove shapes.

7. The light guide plate according to claim 6, wherein a vertex angle between the pattern elements adjacent to each other ranges from 50.degree. to 150.degree.

8. The light guide plate according to claim 1, wherein a light diffusion pattern is provided in the light introduction unit in order to spread the light incident from the incident surface into a width direction of the light introduction unit.

9. The light guide plate according to claim 1, wherein a lenticular lens shape is formed in the light exit surface.

10. A surface illumination device comprising:
the light guide plate according to claim 1; and
a light source disposed in a position opposed to the light incident surface of the light guide plate.

11. The surface illumination device according to claim 10, wherein a plurality of light sources are disposed at intervals P in the position opposed to the light incident surface, and the directivity conversion pattern exists within a region located less than or equal to a distance of $P/[2 \arcsin(1/n)]$ from an end face on a light exit side of the light source, where n is a refractive index of the light guide plate.

12. A liquid crystal display device comprising:
the surface illumination device according to claim 10; and
a liquid crystal panel.

13. A mobile device comprising the liquid crystal display device according to claim 12.

* * * * *